United States Patent
Gross et al.

(10) Patent No.: US 11,674,084 B2
(45) Date of Patent: Jun. 13, 2023

(54) ANISOTROPIC THERMALLY CONDUCTIVE POLYMERS AND METHODS OF MAKING AND USING THE SAME

(71) Applicant: HRL Laboratories, LLC, Malibu, CA (US)

(72) Inventors: Adam Gross, Santa Monica, CA (US); Ashley Dustin, Los Angeles, CA (US); Adam Sorensen, Moorpark, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 17/542,488

(22) Filed: Dec. 5, 2021

(65) Prior Publication Data

US 2022/0251449 A1 Aug. 11, 2022

Related U.S. Application Data

(60) Provisional application No. 63/148,135, filed on Feb. 11, 2021.

(51) Int. Cl.
*C09K 19/38* (2006.01)
*C09K 19/04* (2006.01)

(52) U.S. Cl.
CPC .. *C09K 19/3809* (2013.01); *C09K 2019/0448* (2013.01)

(58) Field of Classification Search
CPC ............ C09K 19/3809; C09K 19/3804; C09K 2019/0448; C09K 2019/0444; C09K 2019/122
See application file for complete search history.

(56) References Cited

U.S. PATENT DOCUMENTS

| | | | |
|---|---|---|---|
| 2004/0015282 A1 | 8/2004 | Tobita et al. | |
| 2004/0152829 A1 | 8/2004 | Tobita et al. | |
| 2022/0251449 A1* | 8/2022 | Gross | C09K 19/3809 |

FOREIGN PATENT DOCUMENTS

| | | |
|---|---|---|
| KR | 20100975613 B1 | 8/2010 |
| KR | 20130016282 A | 2/2013 |

OTHER PUBLICATIONS

Tokita et al., "Thermotropic Liquid Crystals of Main-Chain Polyesters Having a Mesogenic 4,4'-Biphenyldicarboxylate Unit XI. Smectic Liquid Crystalline Glass", Polymer Journal, vol. 30, No. 7, pp. 589-595. (Year: 1988).*
International Search Report and Written Opinion, PCT/US2021/061927, dated Mar. 29, 2022.
Kang et al., "Facile In-situ Polymerization of Thermotropic Liquid Crystalline Polymers as Thermally Conductive Matrix Materials" Fibers and Polymers 2018, vol. 19, No. 6, 1143-1149.
Ge et al., "A homeotropic main-chain tolane-type liquid crystal elastomer film exhibiting high anisotropic thermal conductivity", Soft Matter, 2017,13, 5463-5468.
Tokita et al., "Thermotropic Liquid Crystals of Main-Chain Polyesters with a Mesogenic 4,4'-Biphenyldicarboxylate Unit XII. Unusual Molecular Orientation in Fibers Drawn from Smectic Melt", Polymer Journal, vol. 30, No. 8, pp. 687-690 (1998) [in the Office Action response filed Jan. 10, 2023, "Tokita-2"].

* cited by examiner

Primary Examiner — Geraldina Visconti
(74) Attorney, Agent, or Firm — O'Connor & Company; Ryan P. O'Connor

(57) ABSTRACT

Some variations provide an anisotropic thermally conductive polymer composition comprising a plurality of polarizable, thermotropic main-chain liquid-crystal polymer molecules with crystalline domains. The liquid-crystal polymer molecules are in a nematic phase or a smectic phase, and at least 80% of the crystalline domains are aligned along a crystal axis. A method of making an anisotropic thermally conductive polymer composition comprises: synthesizing or obtaining a polymer containing polarizable domains; heating the polymer to form a polymer melt; cooling the polymer melt to form a thermotropic liquid-crystal polymer; exposing the thermotropic liquid-crystal polymer to an electrical field, thereby aligning the polarizable domains along a crystal axis; and recovering the thermotropic liquid-crystal polymer as an anisotropic thermally conductive polymer composition. The polymer composition may be formed into an object characterized by thermal conductivity along the minimum dimension that is at least three times greater than thermal conductivity along the maximum dimension.

21 Claims, 12 Drawing Sheets

US 11,674,084 B2

ANISOTROPIC THERMALLY CONDUCTIVE POLYMERS AND METHODS OF MAKING AND USING THE SAME

PRIORITY DATA

This patent application is a non-provisional application claiming priority to U.S. Provisional Patent App. No. 63/148,135, filed Feb. 11, 2021, which is hereby incorporated by reference herein.

FIELD OF THE INVENTION

The present invention generally relates to polymer compositions that are thermally conductive but electrically insulative, and methods of making and using these polymer compositions.

BACKGROUND OF THE INVENTION

Liquid crystals (LCs) have properties between those of conventional liquids and those of solid crystals. For instance, a liquid crystal may flow like a liquid, but its molecules may be oriented in a crystal-like way. Liquid crystals can be divided into thermotropic, lyotropic, and metallotropic phases. Thermotropic and lyotropic liquid crystals consist mostly of organic molecules, although a few minerals are also known. Thermotropic LCs exhibit a phase transition into the liquid-crystal phase as temperature is changed. Lyotropic LCs exhibit phase transitions as a function of both temperature and concentration of the liquid-crystal molecules in a solvent (typically water). Metallotropic LCs are composed of both organic and inorganic molecules. The liquid-crystal transition of metallotropic LCs depends not only on temperature and concentration, but also on the inorganic/organic composition ratio.

Liquid-crystal polymers (LCPs) are polymers with the property of a liquid crystal, typically containing aromatic rings. Liquid-crystal elastomers (LCEs) and liquid-crystal networks (LCNs) can exhibit liquid crystallinity as well. Liquid crystallinity in polymers may occur either by dissolving a polymer in a solvent (lyotropic liquid-crystal polymers) or by heating a polymer above its glass-transition or melting point (thermotropic liquid-crystal polymers). LCPs can be melt-processed on conventional equipment. Just as in small-molecule liquid crystals, liquid-crystal polymers also have different mesophases.

Electrically insulating and thermally conductive materials are used to conduct heat out of electronics, electric motors, and batteries without creating an electrical short.

Some conventional approaches use an insulating paper, composite, or polymer with thermal conductivities less than 0.5 W·m$^{-1}$·K$^{-1}$, which is very low. Some approaches use metal heat spreaders that have an insulating layer of polymer on them. This increases the mass due to the metal that weighs much more than the polymer. Polymers filled with high-thermal-conductivity fillers exist—but these composites become highly brittle, have limited thermal conductivity, and cannot be used where some mechanical flexibility is needed. AlN, BN, and SiC crystalline ceramic materials may be used, but they shatter under load and do not conform to surfaces.

Research has focused on achieving high thermal conductivities in polyethylene by stretching the polymer heated to near its melting point over hours, to eventually align crystalline domains. However, this technique results in the high thermal conductivity only being in the plane of the material along the direction of deformation as well as materials that are less than 10 microns thick, which is too thin to be useful. The direction of this thermal conductivity is not beneficial for many thermal interface materials. Additionally, the polyethylene is aligned at 90° C. and cannot be taken above this temperature if properties are to be maintained, which limits its application space.

There is a commercial desire for thermally conductive and electrically insulating polymers, and for objects made from such polymers in which the thermal conductivity may be enhanced in specific directions and dimensions.

SUMMARY OF THE INVENTION

The present invention addresses the aforementioned needs in the art, as will now be summarized and then further described in detail below.

Some variations provide an anisotropic thermally conductive polymer composition comprising a plurality of thermotropic main-chain liquid-crystal polymer molecules, wherein the thermotropic main-chain liquid-crystal polymer molecules each contain crystalline domains; wherein the thermotropic main-chain liquid-crystal polymer molecules are polarizable; wherein the thermotropic main-chain liquid-crystal polymer molecules are characterized by a weight-average molecular weight from about $10^2$ g/mol to about $10^7$ g/mol; wherein the thermotropic main-chain liquid-crystal polymer molecules are in a nematic phase, a smectic phase, or a combination thereof, and wherein at least 80% of the crystalline domains are aligned along a crystal axis with a FWHM degree of alignment of 20 degrees or less.

The anisotropic thermally conductive polymer composition may be formed into an object with a minimum dimension and a maximum dimension, giving an aspect ratio (maximum dimension divided by minimum dimension) selected from 1 to about 100, or from 1 to about 10, for example.

The thermotropic main-chain liquid-crystal polymer molecules are typically in a solid phase and typically not dissolved in a solvent. During alignment (exposing the polymer to an electrical field and/or a magnetic field), the thermotropic main-chain liquid-crystal polymer molecules are preferably in the form of a liquid crystalline phase or a polymer melt, to provide faster polarization and alignment kinetics. Following alignment, the thermotropic main-chain liquid-crystal polymer molecules are preferably in solid form. In certain embodiments, the thermotropic main-chain liquid-crystal polymer molecules are dissolved in a solvent, during alignment and/or after alignment.

The thermotropic main-chain liquid-crystal polymer molecules may be branched, unbranched, or a combination thereof. The thermotropic main-chain liquid-crystal polymer molecules may be crosslinked, uncrosslinked, or a combination thereof.

In some embodiments of the anisotropic thermally conductive polymer composition, the crystalline domains contain aromatic rings. The crystalline domains may or may not contain oxygen.

The thermotropic main-chain liquid-crystal polymer molecules also typically contain amorphous domains, in addition to the crystalline domains. In some embodiments, the amorphous domains contain saturated carbon-carbon bonds, aromatic rings, or a combination thereof. The amorphous domains may or may not contain oxygen.

In some anisotropic thermally conductive polymer compositions, at least 90% of the crystalline domains are aligned along the crystal axis with a FWHM degree of alignment of 20 degrees or less. In some embodiments, at least 80% or at least 90% of the crystalline domains are aligned along the crystal axis with a FWHM degree of alignment of 10 degrees or less.

In some preferred embodiments, the anisotropic thermally conductive polymer composition is formed into an object with a minimum dimension and a maximum dimension, wherein the object is characterized by thermal conductivity along the minimum dimension that is at least three times greater than thermal conductivity along the maximum dimension. In certain preferred embodiments, the thermal conductivity along the minimum dimension is at least ten times greater than thermal conductivity along the maximum dimension.

The significantly enhanced thermal conductivity in the minimum dimension versus the maximum dimension is very different, for example, from stretched polyethylene fibers and films with high aspect ratios. In stretched polyethylene fibers, the thermal conductivity is high only in the direction along the fiber, not in the perpendicular dimension across the fiber thickness.

In some alternative embodiments, the anisotropic thermally conductive polymer composition is formed into an object with a minimum dimension and a maximum dimension, wherein the object is characterized by thermal conductivity along the maximum dimension that is at least three times greater than thermal conductivity along the minimum dimension. In certain alternative embodiments, the thermal conductivity along the maximum dimension is at least ten times greater than thermal conductivity along the minimum dimension.

While stretched polyethylene fibers also provide enhanced thermal conductivity in the maximum dimension versus the minimum dimension, stretched polyethylene fibers are not thermotropic main-chain liquid-crystal polymer molecules.

Other variations of the invention provide an anisotropic thermally conductive polymer composition comprising a plurality of thermotropic main-chain or side-chain liquid-crystal polymer molecules, wherein the thermotropic main-chain or side-chain liquid-crystal polymer molecules each contain crystalline domains; wherein the thermotropic main-chain or side-chain liquid-crystal polymer molecules are polarizable; wherein the thermotropic main-chain or side-chain liquid-crystal polymer molecules are characterized by a weight-average molecular weight from about $10^2$ g/mol to about $10^7$ g/mol; wherein the thermotropic main-chain or side-chain liquid-crystal polymer molecules are in a nematic phase, a smectic phase, or a combination thereof, and wherein at least 80% of the crystalline domains are aligned along a crystal axis with a FWHM degree of alignment of 20 degrees or less.

The anisotropic thermally conductive polymer composition may be formed into an object with a minimum dimension and a maximum dimension, with an aspect ratio (maximum dimension divided by minimum dimension) selected from 1 to about 100, or from 1 to about 10, for example.

In some embodiments, the anisotropic thermally conductive polymer composition comprises a plurality of thermotropic main-chain liquid-crystal polymer molecules. In some embodiments, the anisotropic thermally conductive polymer composition comprises a plurality of thermotropic side-chain liquid-crystal polymer molecules. In certain embodiments, the anisotropic thermally conductive polymer composition comprises a mixture of thermotropic main-chain liquid-crystal polymer molecules and thermotropic side-chain liquid-crystal polymer molecules.

The thermotropic main-chain or side-chain liquid-crystal polymer molecules are typically in a solid phase and typically not dissolved in a solvent. During alignment (exposing the polymer to an electrical field and/or a magnetic field), the thermotropic main-chain or side-chain liquid-crystal polymer molecules are preferably in the form of a polymer melt, to provide faster polarization and alignment kinetics. Following alignment, the thermotropic main-chain or side-chain liquid-crystal polymer molecules are preferably in solid form. In certain embodiments, the thermotropic main-chain or side-chain liquid-crystal polymer molecules are dissolved in a solvent, during alignment and/or after alignment.

In some embodiments, the thermotropic main-chain or side-chain liquid-crystal polymer molecules contain aromatic rings.

The thermotropic main-chain or side-chain liquid-crystal polymer molecules also typically contain amorphous domains, in addition to the crystalline domains. In the case of side-chain liquid-crystal polymers, amorphous domains are preferably present. In some embodiments, the amorphous domains contain saturated carbon-carbon bonds, aromatic rings, or a combination thereof. The amorphous domains may or may not contain oxygen.

In some anisotropic thermally conductive polymer compositions comprising thermotropic main-chain or side-chain liquid-crystal polymer molecules, at least 90% of the crystalline domains are aligned along the crystal axis with a FWHM degree of alignment of 20 degrees or less. In some embodiments, at least 80% or at least 90% of the crystalline domains are aligned along the crystal axis with a FWHM degree of alignment of 10 degrees or less.

In some embodiments, the anisotropic thermally conductive polymer composition is formed into an object characterized by a coefficient of thermal expansion along the crystal axis that is at least 25% lower compared to an otherwise-equivalent main-chain or side-chain liquid-crystal polymer with no alignment of the crystalline domains. In certain embodiments, the object is characterized by a coefficient of thermal expansion along the crystal axis that is at least 50% or at least 90% lower compared to an otherwise-equivalent main-chain or side-chain liquid-crystal polymer with no alignment of the crystalline domains.

The present invention also provides a method of making an anisotropic thermally conductive polymer composition, the method comprising:

synthesizing or obtaining a polymer containing polarizable domains;

heating the polymer to form a polymer melt, wherein the polymer melt is typically not dissolved in a solvent;

cooling the polymer melt to form a thermotropic liquid-crystal polymer containing the polarizable domains;

exposing the thermotropic liquid-crystal polymer and/or the polymer melt to an electrical field between a first anode and a first cathode, thereby aligning at least some of the polarizable domains along a crystal axis; and recovering the thermotropic liquid-crystal polymer as an anisotropic thermally conductive polymer composition.

The method steps may be conducted in various orders of steps, and steps may be combined. For example, the polymer may be synthesized or obtained as a heated polymer melt. As another example of the possible variation in step sequences, exposing the polymer to an electrical field may occur simultaneously with and/or prior to synthesizing, heating, and/or cooling.

Alignment using the electrical field can occur while the polymer is in the liquid crystalline phase, in the isotropic melt phase, or in both of these. When alignment is done in both the isotropic melt phase (polymer melt) and then the liquid crystalline phase (liquid-crystal polymer), the electrical field may be removed during the cooling step that forms the liquid crystalline phase from the isotropic melt phase. In certain embodiments, the electrical field remains on during cooling.

In some embodiments, the cooling step is conducted prior to the exposing step, and the thermotropic liquid-crystal polymer (but not the previous polymer melt) is exposed to the electrical field between the first anode and the first cathode.

In some embodiments, the polymer melt is mechanically or acoustically agitated to induce motion of the polarizable domains. For example, the polymer melt may be subjected to shear forces, before applying the electrical field.

In some embodiments, the thermotropic liquid-crystal polymer is mechanically or acoustically agitated to induce motion of the polarizable domains. For example, the thermotropic liquid-crystal polymer may be subjected to shear forces, before applying the electrical field or during application of the electrical field.

In some embodiments, the thermotropic liquid-crystal polymer is introduced into an electrochemical cell configured with the first anode and the first cathode, such as after the heating and cooling steps. The thermotropic liquid-crystal polymer optionally is mechanically or acoustically agitated within the electrochemical cell. In certain embodiments, the electrochemical cell is configured with multiple anode-cathode pairs, wherein multiple axes of alignment may be generated within the anisotropic thermally conductive polymer composition.

In some embodiments, the heating step and/or the cooling step takes place within an electrochemical cell configured with the first anode and the first cathode. The polymer melt may be mechanically or acoustically agitated within the electrochemical cell.

In some methods, the electrical field has a field strength selected from about 0.1 kV/cm to about 3 kV/cm, such as from about 0.8 kV/cm to about 1.6 kV/cm.

Some methods are effective to cause at least 80% or at least 90% of the polarizable domains to become aligned along a crystal axis with a FWHM degree of alignment of 20 degrees or less, such as 10 degrees or less.

In preferred embodiments, the thermotropic liquid-crystal polymer contains a nematic phase, a smectic phase, or a combination thereof.

In preferred embodiments, the thermotropic liquid-crystal polymer is characterized by a weight-average molecular weight ($M_w$) from about $10^2$ g/mol to about $10^7$ g/mol, such as from about $10^4$ to about $10^6$ g/mol.

In some methods, during or after exposing the thermotropic liquid-crystal polymer to an electrical field, chemical bonding is triggered to increase the $M_w$ of the thermotropic liquid-crystal polymer. Bonding may be induced using elevated temperature, by applying a vacuum to trigger condensation of hydroxyls, by applying ultraviolet light to trigger bonding of acrylates or vinyl groups, or a combination thereof, for example.

In some embodiments, the thermotropic liquid-crystal polymer contains end groups selected from the group consisting of hydroxyl, ester, isocyanate, blocked isocyanate, acrylate, epoxide, amine, vinyl, and combinations thereof. In these or other embodiments, the thermotropic liquid-crystal polymer may contain reversible end groups selected from the group consisting of conjugated dienes, substituted alkenes, furans, maleimides, and combinations thereof. The reversible end groups may be triggered to bond during cooling.

The method may further comprise fabricating an object with a minimum dimension and a maximum dimension, wherein the fabricated object is characterized by thermal conductivity along the minimum dimension that is at least three times greater than thermal conductivity along the maximum dimension. The object is made from the anisotropic thermally conductive polymer composition, possibly with additives. Preferably, the fabricated object is characterized by thermal conductivity along the minimum dimension that is at least ten times greater than thermal conductivity along the maximum dimension. The enhanced thermal conductivity in the minimum dimension results from preferential alignment of crystalline domains in the minimum dimension relative to the maximum dimension.

Alternatively, the method may further fabricating an object from the polymer composition, wherein the fabricated object has a minimum dimension and a maximum dimension, and wherein the fabricated object is characterized by thermal conductivity along the maximum dimension that is at least three times greater than thermal conductivity along the minimum dimension. Preferably, in these alternative embodiments, the fabricated object is characterized by thermal conductivity along the maximum dimension that is at least ten times greater than thermal conductivity along the minimum dimension. The enhanced thermal conductivity in the maximum dimension results from preferential alignment of crystalline domains in the maximum dimension relative to the minimum dimension, in these embodiments.

The method may further comprise fabricating an object from the polymer composition, wherein the fabricated object is characterized by a coefficient of thermal expansion along the crystal axis that is at least 25% lower compared to an otherwise-equivalent anisotropic thermally conductive polymer composition with no alignment of the crystalline domains. Preferably, the fabricated object is characterized by a coefficient of thermal expansion along the crystal axis that is at least 50% or at least 90% lower compared to an otherwise-equivalent anisotropic thermally conductive polymer composition with no alignment of the crystalline domains. The reduced coefficient of thermal expansion along the crystal axis results from preferential alignment of crystalline domains along that axis.

Some embodiments provide a method of making an anisotropic thermally conductive polymer composition, the method comprising:

synthesizing or obtaining a polymer containing polarizable domains;

heating the polymer to form a polymer melt, wherein the polymer melt is typically not dissolved in a solvent;

cooling the polymer melt to form a thermotropic liquid-crystal polymer containing the polarizable domains;

exposing the thermotropic liquid-crystal polymer and/or the polymer melt to a magnetic field, thereby aligning at least some of the polarizable domains along a crystal axis; and recovering the thermotropic liquid-crystal polymer as an anisotropic thermally conductive polymer composition.

DETAILED DESCRIPTION OF EMBODIMENTS OF THE INVENTION

Figure 1A:
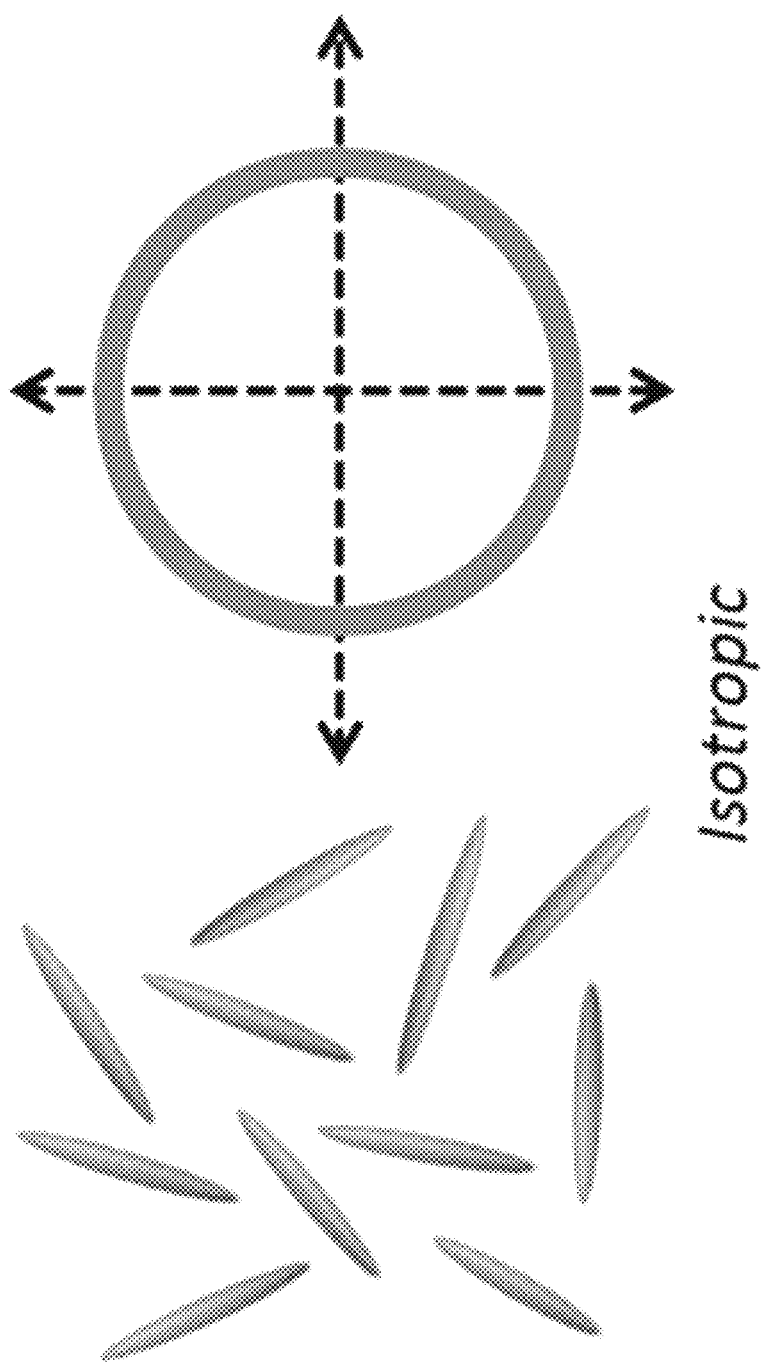
FIG. 1A depicts the lack of alignment of crystalline domains in an isotropic phase of a liquid-crystal polymer.

The principles, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Unless otherwise stated, "thermal conductivity" refers to a material's thermal conductivity k in the given direction or dimension, measured at 25° C. For an isotropic material, the thermal conductivity is the bulk thermal conductivity. For an anisotropic material, the thermal conductivity depends on axis (direction).

Anisotropic thermally conductive polymer compositions are disclosed herein. Some variations of the present invention are predicated on the alignment of crystalline domains in liquid-crystal polymers, resulting in enhanced thermal conductivity along the alignment direction compared to the bulk thermal conductivity of the unaligned polymer. These polymers are unique because they can be aligned with an electrical field E, instead of using solely deformation or shear. E-induced alignment allows high thermal conductivity across the smallest dimension of the material instead of parallel to a long axis. In contrast to the prior art, the present disclosure provides a liquid-crystal polymer composition that is alignable using an electrical field that can be quickly applied in arbitrary directions. An additional benefit to crystalline-domain alignment, in some embodiments, is that the coefficient of thermal expansion is significantly reduced along the crystalline direction compared to the bulk coefficient of thermal expansion of the unaligned polymer.

The anisotropic thermally conductive polymer composition is preferably electrically insulative, i.e., having a low electrical conductivity despite a high thermal conductivity. Polymers with high thermal conductivity but low electrical conductivity are useful in batteries and in electric motors. For example, the disclosed liquid-crystal polymers are useful as heat spreaders and as electric motor slot liners. Another application of the disclosed liquid-crystal polymers is for electronic boxes near aircraft skins that must be offset from the skin to protect them from lightning strikes. The disclosed liquid-crystal polymers may also be used to thermally bridge the boxes to the skin for cooling. High-voltage components (e.g., motors, batteries, and cable) require electrical insulation and thermal cooling, which the disclosed liquid-crystal polymers will simultaneously provide.

It is well-known that an "anisotropic" material has at least one physical property with a different value when measured in different directions. In this specification, the physical property that varies with measurement direction may be thermal conductivity and/or coefficient of thermal expansion. A physical property that varies with measurement direction may be a property that is directly dependent on the thermal conductivity and/or coefficient of thermal expansion. For example, thermal diffusivity scales linearly with thermal conductivity and scales inversely with heat capacity. In some embodiments, the anisotropic composition has other physical properties (e.g., Young's modulus) that depend on direction of measurement.

Some variations provide an anisotropic thermally conductive polymer composition comprising a plurality of thermotropic main-chain liquid-crystal polymer molecules, wherein the thermotropic main-chain liquid-crystal polymer molecules each contain crystalline domains; wherein the thermotropic main-chain liquid-crystal polymer molecules are polarizable; wherein the thermotropic main-chain liquid-crystal polymer molecules are characterized by a weight-average molecular weight from about $10^2$ g/mol to about $10^7$ g/mol; wherein the thermotropic main-chain liquid-crystal polymer molecules are preferably in a nematic phase, a smectic phase, or a combination thereof, and wherein preferably at least 80% of the crystalline domains are aligned along a crystal axis with a full width at half maximum (FWHM) degree of alignment of 20 degrees or less.

Generally speaking, liquid-crystal polymer molecules can be present in one or more phases that are characterized by the type of ordering of polymer molecules. Positional order dictates whether molecules are arranged in any sort of ordered lattice. Orientational order dictates whether molecules are mostly pointing in the same direction. The temperature is important in determining the degree of order. By definition, a liquid crystal is "thermotropic" if the positional and/or orientational order of its components is determined or changed by temperature. Most thermotropic LCs will have an isotropic phase at high temperature (see FIG. 1A, for example). That is, heating will eventually drive polymer molecules into a conventional liquid phase characterized by random and isotropic molecular ordering and fluid-like flow behavior. This phase transition occurs because at high enough temperature, the kinetic energy and motion of the components causes the liquid crystal to become an isotropic liquid. There is a range of intermediate temperatures at which thermotropic phases are observed. If the temperature is too low to support a thermotropic phase, the liquid crystal will change to a solid phase, such as a glass phase. All liquid-crystal polymers have the these phases in order of increasing temperature: solid→liquid crystalline→isotropic.

In a thermotropic phase, there is significant anisotropic orientational structure and short-range orientational order, while the material still retains the ability to flow (beyond the creep flow of a glass phase). Thermotropic phases may be further distinguished by various subphases, including (but not limited to) nematic and smectic phases. Multiple liquid-crystal phases or subphases may be present.

In some embodiments, the thermotropic main-chain liquid-crystal polymer molecules are substantially in a nematic phase. A nematic phase is characterized by a high degree of long-range orientational order but no translational order. Molecules in a nematic phase have long axes that are approximately parallel (see FIG. 1B, for example). Different types of nematic phases exist. For example, a chiral nematic phase is known as a cholesteric phase.

In some embodiments, the thermotropic main-chain liquid-crystal polymer molecules are substantially in a smectic phase. There are many different smectic phases, all characterized by different types and degrees of positional and orientational order. In a smectic A phase, the molecules are oriented along the layer normal (see FIG. 1C, for example). In a smectic C phase, the molecules are tilted away from the layer normal (see FIG. 1D, for example).

Figure 1B:
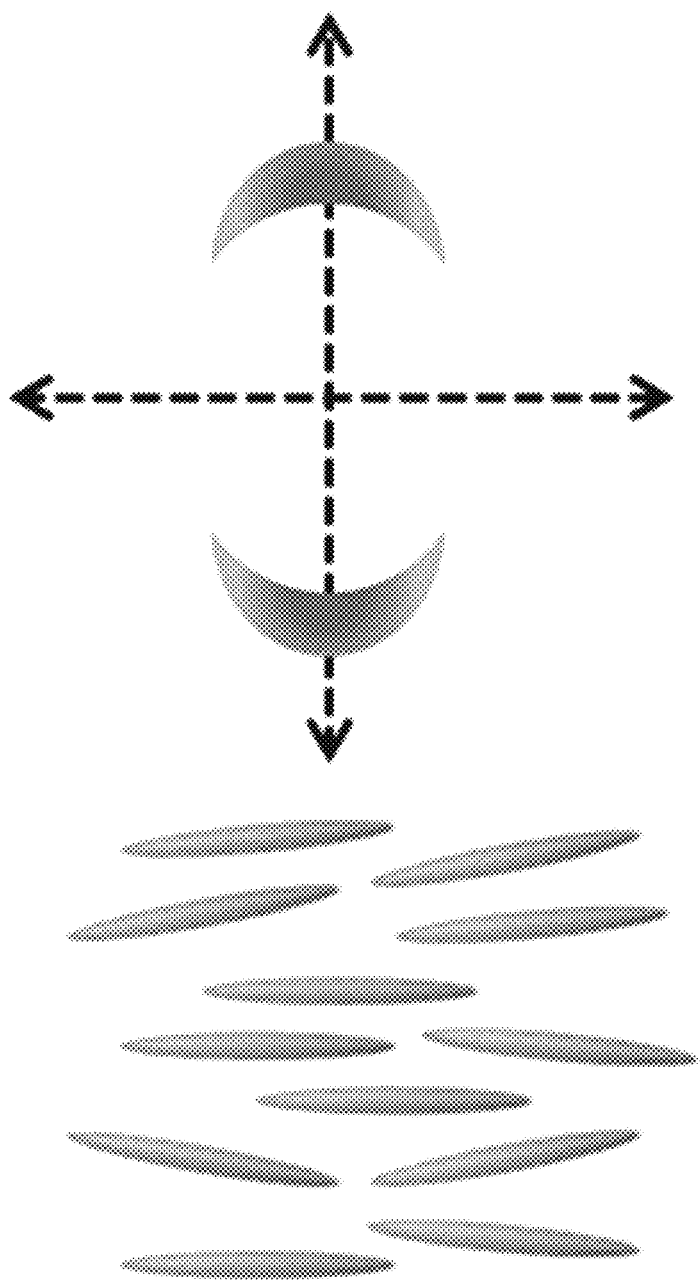
FIG. 1B depicts alignment of crystalline domains in a nematic phase of a liquid-crystal polymer.
Figure 1C:
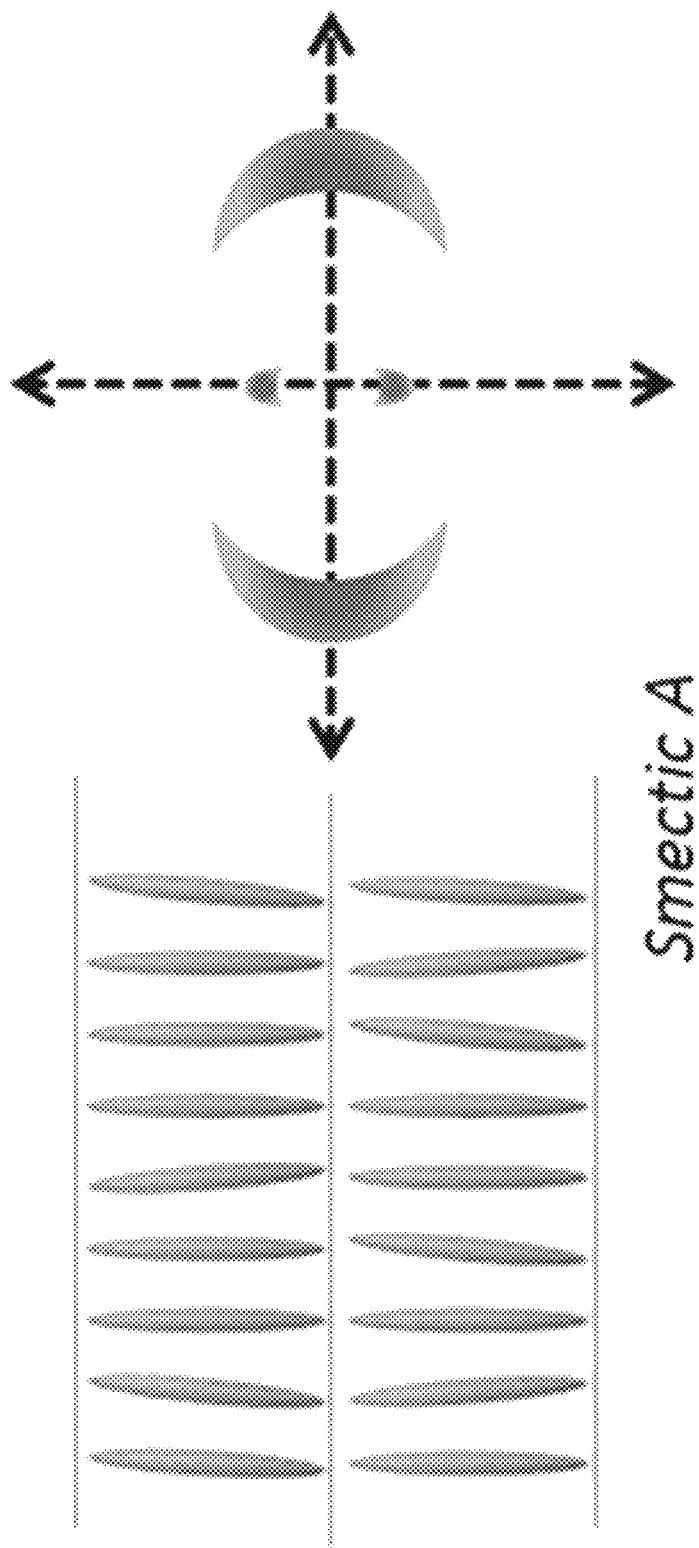
FIG. 1C depicts alignment of crystalline domains in a smectic A phase of a liquid-crystal polymer.
Figure 1D:
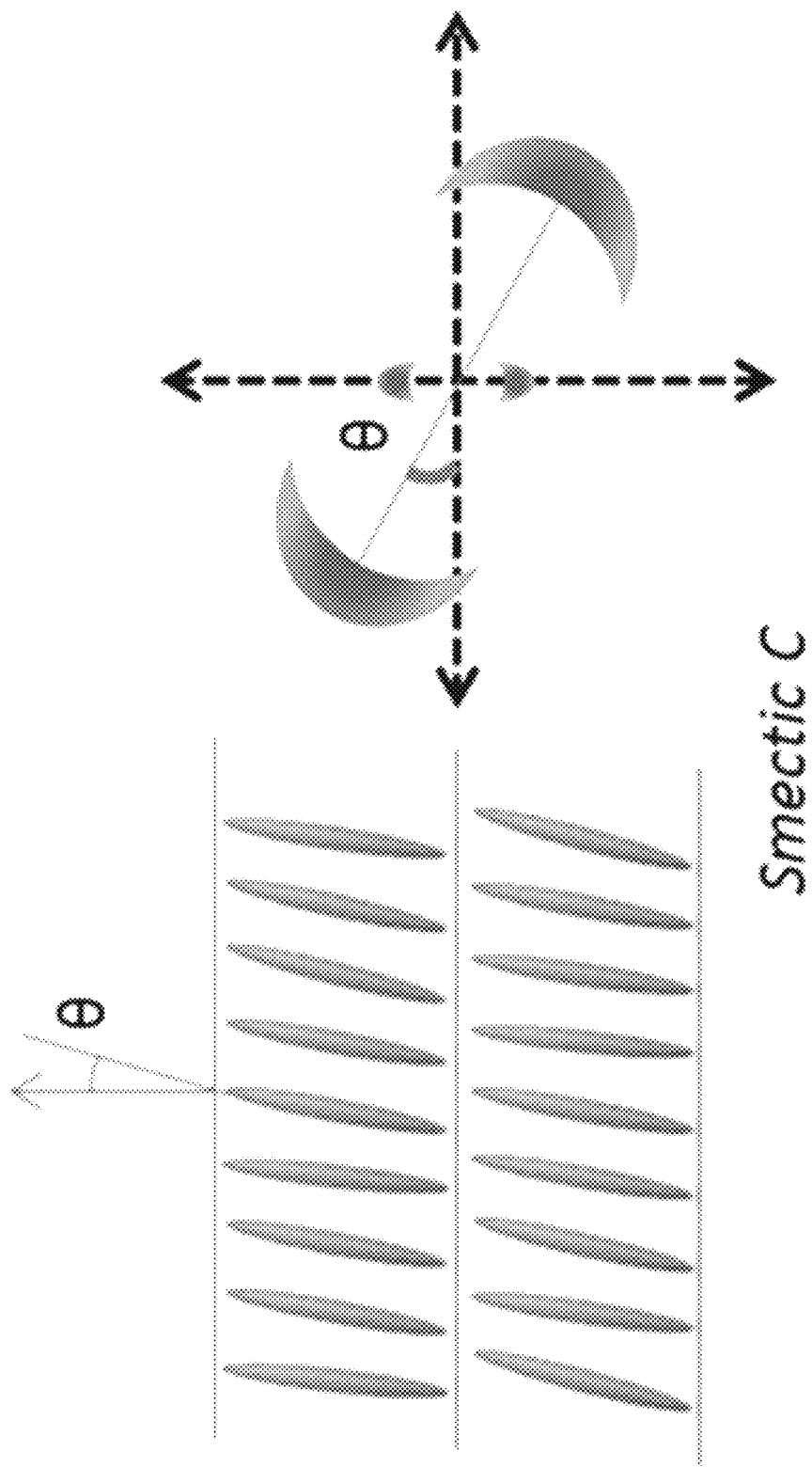
FIG. 1D depicts alignment of crystalline domains in a smectic C phase of a liquid-crystal polymer.

FIG. 1A depicts the lack of alignment of crystalline domains in an isotropic phase of a liquid-crystal polymer. FIG. 1B depicts alignment of crystalline domains in a nematic phase of a liquid-crystal polymer. FIG. 1C depicts alignment of crystalline domains in a smectic A phase of a liquid-crystal polymer. FIG. 1D depicts alignment of crystalline domains in a smectic C phase of a liquid-crystal polymer.

In preferred embodiments, the anisotropic thermally conductive polymer composition does not contain any lyotropic phase of liquid crystals. In preferred embodiments, the anisotropic thermally conductive polymer composition does not contain any metallotropic phase of liquid crystals.

The thermotropic main-chain liquid-crystal polymer molecules are typically in a solid phase and typically not dissolved in a solvent. During alignment (exposing the polymer to an electrical field), the thermotropic main-chain liquid-crystal polymer molecules are preferably in the form of a polymer melt, to provide faster polarization and alignment kinetics. Following alignment, the thermotropic main-chain liquid-crystal polymer molecules are preferably in solid form. In certain embodiments, the thermotropic main-chain liquid-crystal polymer molecules are dissolved in a solvent, during alignment and/or after alignment.

By "main-chain" liquid-crystal polymer molecules, it is meant that the liquid-crystal polymer molecules have rigid mesogens in the polymer backbones (i.e., the main chain of the polymer). A "mesogen" is a compound or part of a compound that displays liquid-crystal properties. In addition to the mesogens, there may be non-mesogenic atoms or functional groups in the main chain. These atoms or functional groups may act as spacers between mesogens.

By "side-chain" liquid-crystal polymer molecules, it is meant that the liquid-crystal polymer molecules have rigid mesogens in the polymer side chains. The mesogens may be linked to the polymer backbone with a non-mesogenic atom or functional group (spacer).

Some embodiments employ a combination of main-chain and side-chain liquid-crystal polymer molecules, possessing mesogenic units in both main chain and side chain of the polymer.

Some embodiments do not utilize side-chain liquid-crystal polymers—that is, there are no polymer side-chain mesogens.

The thermotropic main-chain liquid-crystal polymer molecules may be branched, unbranched, or a combination thereof. The thermotropic main-chain liquid-crystal polymer molecules may be crosslinked, uncrosslinked, or a combination thereof.

Figure 2:
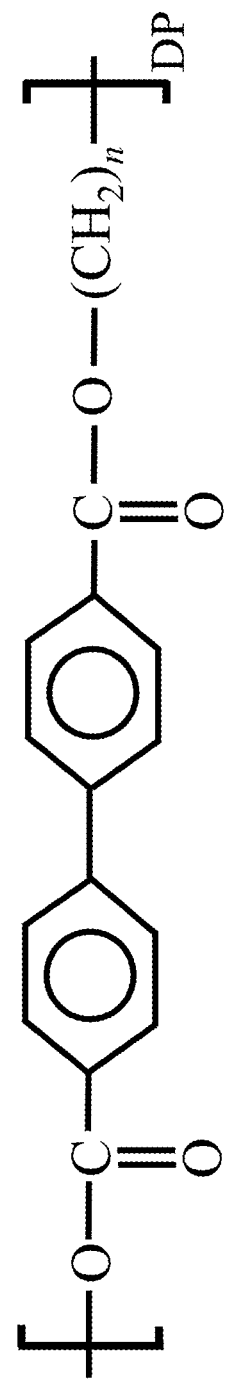
FIG. 2 depicts the structure of the liquid-crystal main-chain polyester fabricated in Example 1, with a mesogenic 4,4'-biphenyldicarboxylate repeat unit (n=6).

In some embodiments of the anisotropic thermally conductive polymer composition, the crystalline domains contain aromatic rings, such as phenyl groups (see FIG. 2, for example). Highly polarizable aromatic mesogens makes the liquid-crystal polymer highly responsive to an electrical field. The crystalline domains may or may not contain oxygen. In some embodiments, the crystalline domains do not contain atoms other than C, H, and O.

The thermotropic main-chain liquid-crystal polymer molecules also typically contain amorphous domains, in addition to the crystalline domains. The thermotropic main-chain liquid-crystal polymer molecules may be characterized by crystallinity, calculated as percent crystalline domains relative to total (crystalline+amorphous) domains. The crystallinity may vary, such as from about 10% to about 100%, or from about 25% to about 95%, or from about 40% to about 90%, for example.

In some embodiments, the amorphous domains contain saturated carbon-carbon bonds, unsaturated carbon-carbon bonds, aromatic rings, or a combination thereof. The amorphous domains may or may not contain oxygen. In some embodiments, the amorphous domains do not contain atoms other than C, H, and O. In some embodiments, the amorphous domains contain atoms besides C, H, O, such as (but not limited to) N, S, B, F, Cl, Li, etc.

In some anisotropic thermally conductive polymer compositions, at least 90% of the crystalline domains are aligned along the crystal axis with a FWHM degree of alignment of 20 degrees or less. In some embodiments, at least 80% or at least 90% of the crystalline domains are aligned along the crystal axis with a FWHM degree of alignment of 10 degrees or less. In various embodiments, at least 80%, 85%, 90%, 95%, or 99% of the crystalline domains are aligned along the crystal axis with a FWHM degree of alignment of 20°, 15°, 10°, 9°, 8°, 7° 6°, 5° 4° 3° 2°, or 1°, or less.

The degree of alignment may be quantified using X-ray diffraction (XRD) by comparing the ratio of XRD peak intensity along the direction of alignment compared to the XRD peak intensity perpendicular to the direction of alignment. See FIGS. 1A, 1B, 1C, and 1D, showing XRD ring patterns and dotted lines that cross the partial rings (one vertical cross compared to one horizontal cross). The FWHM of the peaks in each XRD ring may be calculated by performing a circular integration.

Another way to measure alignment of crystalline domains is with polarization of light. The degree of alignment may be quantified by measuring the amount of linearly polarized light created by the polymer when it is illuminated with unpolarized light. If the polymer is fully aligned, only one linear polarization of light will transmit through the polymer. The direction of physical alignment will act as an absorptive linear polarizer and the polarization that preferably passes is perpendicular to the direction of alignment. For example, if the polymer domains are aligned vertically, then horizontally linearly polarized light will pass through the polymer, but vertically linearly polarized light will be absorbed. The ratio of vertical to horizontal polarization quantifies the degree of alignment. A ratio of one means the polymer is not aligned. As the ratio diverges from one, there is increasing alignment. A ratio of 100 or 0.01 would be indicative of alignment equal to a commercial polarizer, for example.

In some embodiments, there is at least a 2:1 ratio, a 3:1 ratio, a 4:1 ratio, a 5:1 ratio, or a 10:1 ratio between two linear polarizations of light when the direction of alignment is perpendicular to the incident light and the polymer is illuminated with incident light perpendicular to the alignment direction. This measurement may utilize Stokes polarimetry. See, for example, Folwill et al., "Measuring the spatial distribution of liquid crystal alignment and retardation using stokes polarimetry", Proc. SPIE 11352, *Optics and Photonics for Advanced Dimensional Metrology*, 113520U (April 2020), which is hereby incorporated by reference.

In some preferred embodiments, the anisotropic thermally conductive polymer composition is in the form of an object with a minimum dimension and a maximum dimension, wherein the object is characterized by thermal conductivity along the minimum dimension that is at least three times greater than thermal conductivity along the maximum dimension. In certain preferred embodiments, the thermal conductivity along the minimum dimension is at least ten times greater than thermal conductivity along the maximum dimension. In various embodiments, the thermal conductivity along the minimum dimension is at least 2×, 3×, 4×, 5×, 6×, 7×, 8×, 9×, 10×, 15×, or 20× compared to the thermal conductivity along the maximum dimension. The enhanced thermal conductivity in the minimum dimension results from preferential alignment of crystalline domains in the minimum dimension relative to the maximum dimension.

Figure 8:
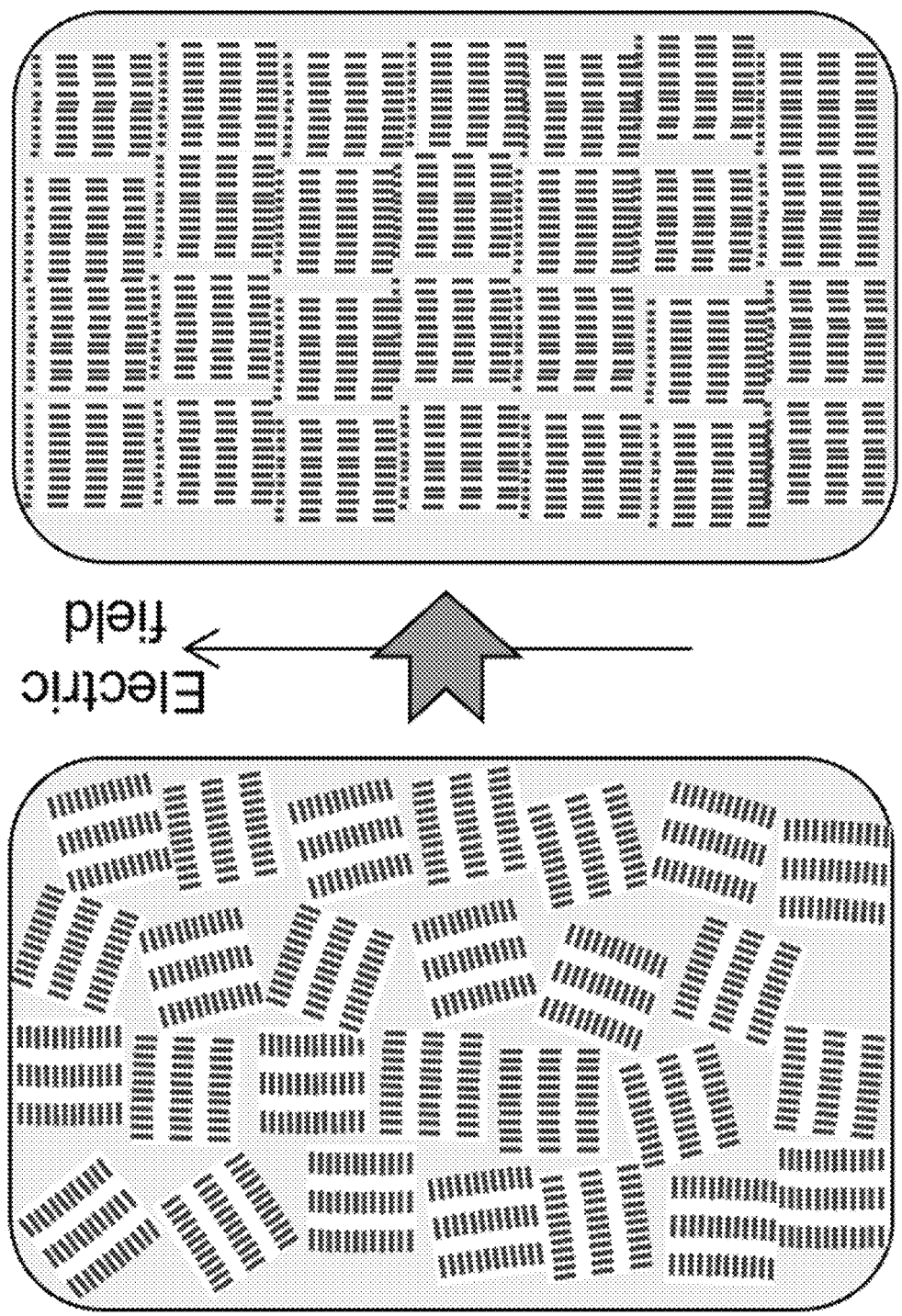
FIG. 8 is a schematic diagram depicting electrical-field alignment of crystalline domains in a liquid-crystal polymer.

FIG. 8 is a schematic diagram depicting electrical-field alignment of crystalline domains in a liquid-crystal polymer.

In this drawing, the unaligned polymer becomes aligned when exposed to the electrical field. The polymer is in the form of an object (rectangular slab of polymer) which has a two-dimensional aspect ratio of about 2. The third dimension (not shown in the 2D drawing of FIG. 8) of the object may vary and may be the minimum dimension or the maximum dimension of the 3D object. The specific geometric of the object may vary widely according to known polymer-processing techniques, such as injection molding, extrusion, additive manufacturing, or other fabrication techniques.

The significantly enhanced thermal conductivity in the minimum dimension versus the maximum dimension is very different, for example, from stretched polyethylene fibers. In those fibers, the thermal conductivity is high only in the direction along the fiber, not in the perpendicular dimension across the fiber thickness.

In some alternative embodiments, the anisotropic thermally conductive polymer composition is in the form of an object with a minimum dimension and a maximum dimension, wherein the object is characterized by thermal conductivity along the maximum dimension that is at least three times greater than thermal conductivity along the minimum dimension. In certain alternative embodiments, the thermal conductivity along the maximum dimension is at least ten times greater than thermal conductivity along the minimum dimension. In various embodiments, the thermal conductivity along the maximum dimension is at least 2×, 3×, 4×, 5×, 6×, 7×, 8×, 9×, 10×, 15×, or 20× compared to the thermal conductivity along the minimum dimension. The enhanced thermal conductivity in the maximum dimension results from preferential alignment of crystalline domains in the maximum dimension relative to the minimum dimension, in these embodiments.

The anisotropic thermally conductive polymer composition may be in the form of an object with a maximum dimension, a minimum dimension, and an aspect ratio defined as the maximum dimension divided by the minimum dimension. The geometry of the object may be a sphere, a cylinder, a cube, a flat plate, a platelet, a rod, a bar, or a film, for example. The aspect ratio may be selected from about 1 to about 100, for example, such as from about 1 to about 10. In various embodiments, the aspect ratio of the object is about, or at most about, 1, 2, 3, 4, 5, 6, 7, 8, 9, 10, 15, 20, 25, 50, 75, 90, or 100, including all intervening ranges (e.g., 1-20, 2-90, etc.). The object may be a structure, a structural support, a coating, or another type of object containing the anisotropic thermally conductive polymer composition.

In some embodiments, the anisotropic thermally conductive polymer-containing object is not a polymer fiber. Typically, a polymer fiber has an aspect ratio greater than 100, such as 500, 1000, 2000, or even higher. While stretched polyethylene fibers also provide enhanced thermal conductivity in the maximum dimension versus the minimum dimension, stretched polyethylene fibers are not thermotropic main-chain liquid-crystal polymer molecules.

The anisotropic thermally conductive polymer-containing object is characterized by thermal conductivity along the alignment direction that is higher than the bulk thermal conductivity of the same unaligned polymer. In various embodiments, an anisotropic thermally conductive polymer-containing object is characterized by thermal conductivity along the alignment direction that is at least about 1.5×, 2×, 3×, 5×, 10×, 20×, 30×, 40×, 50×, 100×, or more, compared to the bulk thermal conductivity of the same unaligned polymer.

The bulk thermal conductivity of the unaligned polymer may be on the order of 0.1 W·m$^{-1}$ K$^{-1}$ to 1 W·m$^{-1}$·K$^{-1}$, measured at 25° C. The thermal conductivity of the anisotropic thermally conductive polymer-containing object may be enhanced along the alignment direction-which may be the minimum dimension, the maximum dimension, or an angle between these dimensions—to about, or at least about, 0.5, 1, 2, 3, 4, 5, 6, 7, 8, 9, 10, 11, 12, 13, 14, 15, 20, 25, 30, 35, 40, 45, or 50 W·m$^{-1}$·K$^{-1}$, including all intervening ranges, for example (measured at 25° C.). In an anisotropic material, thermal conductivity is a second-rank tensor k rather than a single value k. The thermal conductivity in the alignment direction is a certain value, but it will be understood that other k values can be calculated for arbitrary directions.

The thermotropic main-chain liquid-crystal polymer molecules preferably have a low electrical conductivity in all directions. An anisotropic thermally conductive polymer-containing object containing the liquid-crystal polymers preferably has a low electrical conductivity in all dimensions (minimum dimension, maximum dimension, and any other dimensions). The electrical conductivity may be isotropic or slightly anisotropic. The average electrical conductivity of the thermotropic main-chain liquid-crystal polymer molecules may be about, or less than about, 10$^{-3}$ S/m, 10$^{-4}$ S/m, 10$^{-5}$ S/m, 10$^{-6}$ S/m, 10$^{-7}$ S/m, 10$^{-8}$ S/m, 10$^{-9}$ S/m, 10$^{-10}$ S/m, 10$^{-11}$ S/m, 10$^{-12}$ S/m, 10$^{-13}$ S/m, 10$^{-14}$ S/m, 10$^{-15}$ S/m, or 10$^{-16}$ S/m, including all intervening ranges, for example (measured at 25° C.).

When the thermotropic main-chain liquid-crystal polymer molecules are in the form of an anisotropic thermally conductive polymer-containing object (which may contain additives or other components), the object may have an average or maximum (in one dimension) electrical conductivity of about, or less than about, 10$^{-3}$ S/m, 10$^{-4}$ S/m, 10$^{-5}$ S/m, 10$^{-6}$ S/m, 10$^{-7}$ S/m, 10$^{-8}$ S/m, 10$^{-9}$ S/m, 10$^{-10}$ S/m, 10$^{-11}$ S/m, 10$^{-12}$ S/m, 10$^{-13}$ S/m, 10$^{-14}$ S/m, or 10$^{-15}$ S/m, including all intervening ranges, for example (measured at 25° C.).

The polarizability of the polarizable polymer molecules may be characterized by their electric susceptibility. The electric susceptibility $\chi_e$ is a dimensionless proportionality constant that indicates the degree of polarization of a dielectric material in response to an applied electric field. The greater the electric susceptibility, the greater the ability of a material to polarize in response to the field, and thereby reduce the total electric field inside the material. The electric susceptibility $\chi_e$ scales linearly with the dimensionless dielectric constant κ. The dielectric constant κ of the liquid-crystal polymer molecules may be about, at least about, or at most about 2, 2.1, 2.2, 2.3, 2.4, 2.5, 2.6, 2.7, 2.8, 2.9. 3, 3.5, 4, 4.5, 5, 6, 7, 8, 9, 10, 11, 12, 13, 14, 15, 16, 17, 18, 19, or 20, including all intervening ranges (measured at 25° C.).

In addition to anisotropy of thermal conductivity, there may be anisotropy of coefficient of thermal expansion. When there is alignment along the crystal axis, there may be a reduction in coefficient of thermal expansion (CTE) measured along that axis. Unless otherwise stated, the CTE is measured at 25° C. and represents the coefficient of linear thermal expansion.

Other variations of the invention provide an anisotropic thermally conductive polymer composition comprising a plurality of thermotropic main-chain or side-chain liquid-crystal polymer molecules, wherein the thermotropic main-chain or side-chain liquid-crystal polymer molecules each contain crystalline domains; wherein the thermotropic main-chain or side-chain liquid-crystal polymer molecules are polarizable; wherein the thermotropic main-chain or side-chain liquid-crystal polymer molecules are characterized by a weight-average molecular weight from about 10$^2$ g/mol to about 10$^7$ g/mol; wherein the thermotropic main-chain or side-chain liquid-crystal polymer molecules are in a nematic phase, a smectic phase, or a combination thereof; and wherein at least 80% of the crystalline domains are aligned along a crystal axis with a FWHM degree of alignment of 20 degrees or less.

In some embodiments, the anisotropic thermally conductive polymer composition comprises a plurality of thermotropic main-chain liquid-crystal polymer molecules. In some embodiments, the anisotropic thermally conductive polymer composition comprises a plurality of thermotropic side-chain liquid-crystal polymer molecules. In certain embodiments, the anisotropic thermally conductive polymer composition comprises a mixture of thermotropic main-chain liquid-crystal polymer molecules and thermotropic side-chain liquid-crystal polymer molecules. Side-chain liquid-crystal polymers may be easier to align because only the side chains that contain mesogens must move in response to an electrical field. Side-chain liquid-crystal polymers may be used to modify the coefficient of thermal expansion of the polymer or may be used in a polymer with unequal thermal conductivity along different axes. For controlling thermal expansion, either side-chain and main-chain liquid-crystal polymers (or a combination thereof) may be employed.

In some embodiments, the anisotropic thermally conductive polymer composition is in the form of an object, which may be referred to as an anisotropic-CTE object. The anisotropic-CTE object may be characterized by a CTE along the crystal axis that is at least 25% lower compared to an otherwise-equivalent main-chain or side-chain liquid-crystal polymer with no alignment of the crystalline domains. In certain embodiments, the anisotropic-CTE object is characterized by a CTE along the crystal axis that is at least 50% or at least 90% lower compared to an otherwise-equivalent main-chain or side-chain liquid-crystal polymer with no alignment of the crystalline domains. In various embodiments, the anisotropic-CTE object is characterized by a CTE along the crystal axis that is at least 10%, 15%, 20%, 25%, 30%, 40%, 50%, 60%, 70%, 80%, 90%, 95%, or 99% lower compared to an otherwise-equivalent main-chain or side-chain liquid-crystal polymer with no alignment of the crystalline domains.

The coefficient of thermal expansion of the unaligned polymer may be on the order of 10$^{-6}$ K$^{-1}$ to 10$^{-4}$ K$^{-1}$, for example. The CTE of the anisotropic-CTE object may be reduced along the alignment direction-which may be the minimum dimension, the maximum dimension, or an angle between these dimensions—to about, or at most about, 10$^{-6}$ K$^{-1}$, 10$^{-5}$ K$^{-1}$, or 10$^{-4}$ K$^{-1}$, including all intervening ranges, for example. The anisotropic-CTE object may have an average or maximum (in one dimension) electrical conductivity of about, or less than about, 10$^{-1}$ S/m, 10$^{-4}$ S/m, 10$^{-5}$ S/m, 10$^{-6}$ S/m, 10$^{-7}$ S/m, 10$^{-8}$ S/m, 10$^{-9}$ S/m, 10$^{-10}$ S/m, 10$^{-11}$ S/m, 10$^{-12}$ S/m, 10$^{-13}$ S/m, 10$^{-14}$ S/m, or 10$^{-15}$ S/m, including all intervening ranges, for example (measured at 25° C.).

The thermotropic main-chain or side-chain liquid-crystal polymer molecules are typically in a solid phase and typically not dissolved in a solvent. During alignment (exposing the polymer to an electrical field), the thermotropic main-chain or side-chain liquid-crystal polymer molecules are preferably in the form of a polymer melt, to provide faster polarization and alignment kinetics. Following alignment, the thermotropic main-chain or side-chain liquid-crystal polymer molecules are preferably in solid form. In certain embodiments, the thermotropic main-chain or side-chain liquid-crystal polymer molecules are dissolved in a solvent, during alignment and/or after alignment.

In some embodiments, the thermotropic main-chain or side-chain liquid-crystal polymer molecules contain aromatic rings.

The thermotropic main-chain or side-chain liquid-crystal polymer molecules also typically contain amorphous domains, in addition to the crystalline domains. In some embodiments, the amorphous domains contain saturated carbon-carbon bonds, aromatic rings, or a combination thereof. The amorphous domains may or may not contain oxygen.

In some anisotropic thermally conductive polymer compositions comprising thermotropic main-chain or side-chain liquid-crystal polymer molecules, at least 90% of the crystalline domains are aligned along the crystal axis with a FWHM degree of alignment of 20 degrees or less. In some embodiments, at least 80% or at least 90% of the crystalline domains are aligned along the crystal axis with a FWHM degree of alignment of 10 degrees or less.

The present invention also provides a method of making an anisotropic thermally conductive polymer composition, the method comprising:

synthesizing or obtaining a polymer containing polarizable domains;

heating the polymer to form a polymer melt, wherein the polymer melt is typically not dissolved in a solvent;

cooling the polymer melt to form a thermotropic liquid-crystal polymer containing the polarizable domains;

exposing the thermotropic liquid-crystal polymer to an electrical field between a first anode and a first cathode, thereby aligning at least some of the polarizable domains along a crystal axis; and recovering the thermotropic liquid-crystal polymer as an anisotropic thermally conductive polymer composition.

Figure 9:
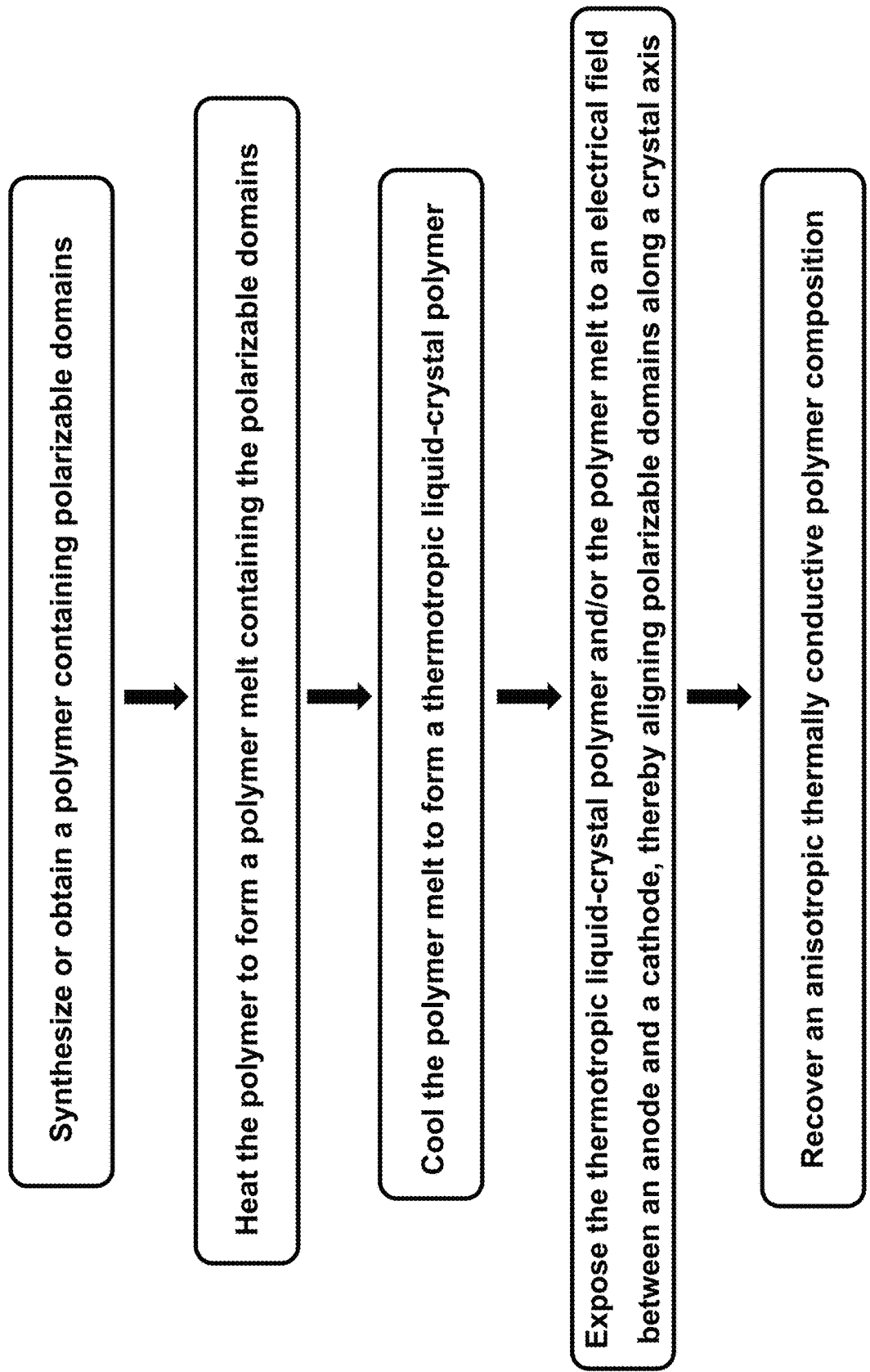
FIG. 9 is an exemplary flowchart depicting a method of the invention, in some embodiments.

FIG. 9 is an exemplary flowchart depicting a method of the invention, in some embodiments.

The method steps may be conducted in various orders of steps, and steps may be combined. For example, the polymer may be synthesized or obtained as a heated polymer melt. As another example, exposing the polymer to an electrical field may occur simultaneously with and/or prior to synthesizing, heating, and/or cooling.

Alignment using the electrical field can occur while the polymer is in the liquid crystalline phase, in the isotropic melt phase, or in both of these. When alignment is done in both the isotropic melt phase (polymer melt) and then the liquid crystalline phase (liquid-crystal polymer), the electrical field may be removed during the cooling step that forms the liquid crystalline phase from the isotropic melt phase. In certain embodiments, the electrical field remains on during cooling.

In some embodiments, the method comprises: synthesizing or obtaining a polymer containing polarizable domains;

heating the polymer to form a polymer melt, wherein the polymer melt is typically not dissolved in a solvent;

exposing the polymer melt to an electrical field between a first anode and a first cathode, thereby aligning at least some of the polarizable domains along a crystal axis;

cooling the polymer melt to form a thermotropic liquid-crystal polymer containing the polarizable domains; and recovering the thermotropic liquid-crystal polymer as an anisotropic thermally conductive polymer composition.

In some embodiments, the thermotropic liquid-crystal polymer is mechanically or acoustically agitated to induce motion of the polarizable domains.

In some embodiments, the thermotropic liquid-crystal polymer is introduced into an electrochemical cell configured with the first anode and the first cathode, such as (but not limited to) after the heating and cooling steps. The thermotropic liquid-crystal polymer optionally is mechanically or acoustically agitated within the electrochemical cell. In certain embodiments, the electrochemical cell is configured with multiple anode-cathode pairs, wherein multiple axes of alignment may be generated within the anisotropic thermally conductive polymer composition.

In some embodiments, the heating step and/or the cooling step takes place within an electrochemical cell configured with the first anode and the first cathode. The polymer melt may be mechanically or acoustically agitated within the electrochemical cell.

In some methods, the electrical field has a field strength selected from about 0.1 kV/cm to about 3 kV/cm, such as from about 0.8 kV/cm to about 1.6 kV/cm. In various embodiments, the electrical field strength is about, at least about, or at most about 0.01, 0.02, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5, or 5.0 kV/cm, including all intervening ranges.

Some methods are effective to cause at least 80% or at least 90% of the polarizable domains to become aligned along a crystal axis with a FWHM degree of alignment of 20 degrees or less, such as 10 degrees or less.

In preferred embodiments, the thermotropic liquid-crystal polymer contains a nematic phase, a smectic phase, or a combination thereof. A smectic phase may be somewhat preferable over a nematic phase.

In preferred embodiments, the thermotropic liquid-crystal polymer is characterized by a weight-average molecular weight ($M_w$) from about $10^2$ g/mol to about $10^7$ g/mol, such as from about $10^4$ to about $10^6$ g/mol. In various embodiments, $M_w$ is selected to be about, at least about, or at most about $10^2$ g/mol, $10^1$ g/mol, $10^4$ g/mol, $10^5$ g/mol, $10^6$ g/mol, or $10^7$ g/mol, including all intervening ranges. In certain embodiments, $M_w$ is at least 5,000 g/mol or greater than 5,000 g/mol.

In some methods, during or after exposing the thermotropic liquid-crystal polymer to an electrical field, chemical bonding is triggered to increase the $M_w$ of the thermotropic liquid-crystal polymer. Bonding may be induced using elevated temperature, by applying a vacuum to trigger condensation of hydroxyls, by applying ultraviolet light to trigger bonding of acrylates or vinyl groups, or a combination thereof, for example.

In some embodiments, the thermotropic liquid-crystal polymer contains end groups selected from the group consisting of hydroxyl, ester, isocyanate, blocked isocyanate, acrylate, epoxide, amine, vinyl, and combinations thereof. In these or other embodiments, the thermotropic liquid-crystal polymer may contain reversible end groups selected from the group consisting of conjugated dienes, substituted alkenes, furans, maleimides, and combinations thereof.

The method may further comprise disposing the anisotropic thermally conductive polymer composition to fabricate an object with a minimum dimension and a maximum dimension, wherein the fabricated object is characterized by thermal conductivity along the minimum dimension that is at least three times greater than thermal conductivity along the maximum dimension. Preferably, the fabricated object is characterized by thermal conductivity along the minimum dimension that is at least ten times greater than thermal conductivity along the maximum dimension.

Alternatively, the method may further comprise disposing the anisotropic thermally conductive polymer composition to fabricate an object with a minimum dimension and a maximum dimension, wherein the fabricated object is characterized by thermal conductivity along the maximum dimension that is at least three times greater than thermal conductivity along the minimum dimension. Preferably, in these alternative embodiments, the fabricated object is characterized by thermal conductivity along the maximum dimension that is at least ten times greater than thermal conductivity along the minimum dimension.

The method may further comprise disposing the anisotropic thermally conductive polymer composition to fabricate an object characterized by a coefficient of thermal expansion along the crystal axis that is at least 25% lower compared to an otherwise-equivalent anisotropic thermally conductive polymer composition with no alignment of the crystalline domains. Preferably, the fabricated object is characterized by a coefficient of thermal expansion along the crystal axis that is at least 50% or at least 90% lower compared to an otherwise-equivalent anisotropic thermally conductive polymer composition with no alignment of the crystalline domains. The reduced coefficient of thermal expansion along the crystal axis results from preferential alignment of crystalline domains along that axis.

After fabrication and during use of the anisotropic thermally conductive polymer composition, the polymer composition may be electrically actuated to switch thermal conductivity and/or CTE in a certain dimension. These embodiments are premised on the realization that the polarizable domains will still be present in the final composition. The fabricated object (e.g., an engineered part) may itself be exposed to an electrical field to optimize the thermal conductivities in different dimensions of the object.

Various principles, aspects, embodiments, and examples of the present invention will now be further described, without limitation.

Some embodiments are premised on the reduction of phonon scattering in polymers. A "phonon" is a collective excitation in a periodic, elastic arrangement of atoms or molecules in condensed matter (such as a polymer). A phonon is an excited state in the quantum-mechanical quantization of the modes of vibrations for elastic structures of interacting particles. Phonons can be thought of as quantized sound waves, similar to photons as quantized light waves.

Linear polymers reduce phonon scattering. To limit phonon scattering, linear, unbranched, uncrosslinked polymers are preferred. The linear, unbranched, uncrosslinked polymer may be a homopolymer which is a chain of one type of chemically linked monomers. The linear, unbranched, uncrosslinked polymer may be a copolymer that contains two or more types of monomers forming the same polymer chain (e.g., an alternating copolymer or a block copolymer). Branched copolymers are less preferred because they will typically cause phonon scattering at the branch points.

Crosslinking is less preferred because, like branching, crosslinking also creates branch points that can scatter phonons. In some embodiments, there is little or no crosslinking in the liquid-crystal polymer. It is possible for a crosslinked polymer to be present as a low-concentration additive in the overall composition.

Higher molecular weights (such as $M_w=10^3$ g/mol or higher) result in fewer terminal ends and less phonon scattering. In some embodiments, the $M_w$ of the liquid-crystal polymer is at least 2,000 g/mol, at least 4,000 g/mol, at least 5,000 g/mol, at least 7,500 g/mol, or at least 10,000 g/mol.

In the prior art, aligned crystalline domains have been created in polyethylene through stretching. See Ronca et al., "Metallic-like thermal conductivity in a lightweight insulator: Solid-state processed Ultra High Molecular Weight Polyethylene tapes and films", *Polymer* 123 (2017) 203-210 (hereinafter, "Ronca"); and Xu et al., "Nanostructured polymer films with metal-like thermal conductivity", *NATURE COMMUNICATIONS* (2019) 10:1771 (hereinafter, "Xu"), which are incorporated by reference herein. Ronca and Xu show polyethylene having about 3× higher thermal conductivity than steel. High-thermal-conductivity polyethylene is created by crystallizing the polymer chains and aligning the crystals along one direction via elevated-temperature deformation. These techniques rely on hours of heated deformation, which is difficult to scale commercially. The technique of Xu also requires first quenching the polymer on a plate cooled with liquid nitrogen. The resulting materials are <25 microns thick and are size-limited due to the large drawing ratios. In both Ronca and Xu, high thermal conductivity is obtained by (i) creating aligned and crystalline polymer domains with 25-100× deformation of the original polymer dimension; (ii) reducing phonon scattering by making high-molecular-weight homopolymers with limited entanglement; and (iii) inducing some degree of order in the amorphous sections of polymer between the crystalline domains. These polyethylene polymers are limited by the low deformation temperature of polyethylene (about 90° C.). Also, these are not liquid-crystal polymers.

The present invention is a significant improvement over the above-mentioned prior art pertaining to polyethylene films.

The present invention utilizes a force for alignment that is more scalable and flexible than deformation. Electrical fields are easy to create and can be applied in arbitrary directions. To respond to electric fields, liquid-crystal polymers are utilized. These polymers consist of a flexible spacer and a rigid mesogen as a repeat unit in a polymer. The mesogen may contain aromatic rings which are high polarizable and create induced dipoles in an electrical field, thereby inducing orientation and ordering. Main-chain polymers limit phonon scattering.

The flexible spacers are typically between 4 and 20 atoms long. They allow enough space between mesogens for the mesogens to align and stack with neighboring mesogens. The flexible spacers reduce the processing temperature of liquid crystalline polymers compared to polymers made from only mesogens. The flexible spacers may be formed from alkanes, poly(alkyl oxides) such as poly(ethylene oxide) or poly(p-phenylene oxide), or silicones, for example.

It is preferable to employ polymers that have a drive to crystallize and will align the crystalline domains collectively in a certain direction. Nematic and smectic (preferably, smectic A) liquid-crystal polymers align all domains along one direction. Smectic phases have regular spacing between layers of aligned domains. These phases, which occur in a particular temperature regime, depend on the liquid-crystal structure and can be locked in place. The liquid-crystal nature remains when the polymer is cooled below the solid-to-liquid crystalline transition. The organized crystallinity reduces phonon scattering, which improves thermal conductivity.

Entanglement is preferably limited so that the polymers crystallize along a polymer chain. Solventless, thermotropic liquid-crystal polymers are preferable because the absence of solvent limits entanglement, in contrast to lyotropic liquid-crystal polymers that require a solvent to form different phases. Note that incidental materials such as impurities or moisture may be present and are not considered solvents even if they have some solubility with the liquid-crystal polymers.

It is preferable for there to be some degree of order in the amorphous phase of the thermotropic liquid-crystal polymer molecules. Order may be created in several ways. In some preferred embodiments, the flexible spacer is crystallizable. In some embodiments, a hydrocarbon flexible spacer is more polarizable along a chain than across the chain and will align with a field (see Lenz, "Synthesis and Properties of Thermotropic Liquid Crystal Polymers with Main Chain Mesogenic Units", *Polymer Journal*, Vol. 17, pp. 105-115 (1985), which is hereby incorporated by reference). In some embodiments, a flexible spacer length is chosen to not have an excess distance between the crystallized mesogens, thereby resulting in order dictated by the spacing of the crystals. In some embodiments, a flexible spacer has order induced through van der Waals interactions with aligned mesogens. A partially ordered flexible spacer may be observed by a minimum melting point for a solid-to-liquid crystalline transition in a liquid-crystal polymer. This minimum may occur in a series with the same mesogen by increasing flexible spacer length, as described in Table 1 of Lenz, cited above.

Phonon scattering is reduced when polymers have higher chemical uniformity (i.e., fewer types of atoms or functional groups). For example, polyethylene has 2-3× higher thermal conductivity than polyethylene oxide which contains oxygen between ethylene units. In some embodiments, thermal conductivity is maximized by minimizing oxygen linkages. An example of a candidate polymer is described by Kantor et al., "Thermotropic Hydrocarbon Main-Chain Liquid Crystalline Polymers Based on a Biphenyl Mesogen. Synthesis and Characterization", *Macromolecules* 1992, 25, 11, 2789-2795, which is hereby incorporated by reference. The homopolymer disclosed by Kantor et al. has biphenyl mesogenic units and polymethylene spacers in the main chain. The biphenyl mesogenic units resemble graphite. Both graphite and polymethylene have high theoretical thermal conductivities. The main chain contains only C and H atoms; there are no heteroatoms (e.g., O, N, or S) that scatter phonons. This homopolymer forms a smectic phase.

The phase-transition temperatures associated with the liquid-crystal polymer may be determined experimentally or theoretically. As stated earlier, as temperature is increased, a liquid-crystal polymer changes from a solid phase to a liquid crystalline phase, and finally to an isotropic liquid. The alignment with electrical field is preferably performed at a temperature for which there is a liquid crystalline phase, or possibly at multiple temperatures, at least one of which is for a liquid crystalline phase. One skilled in the art, given a liquid-crystal polymer, will be able to determine phase-transition temperatures including a melting temperature, a glass-transition temperature, and a temperature or temperature range for the formation and loss of liquid crystals. In some embodiments, for example, the liquid-crystal polymer is stable up to 300° C., at which temperature an isotropic phase begins to form which will disable the alignment in an electrical field as the crystalline domains are essentially melted.

An exemplary method to make an anisotropic thermally conductive polymer composition will now be described. First, a main-chain, thermotropic, liquid-crystal polymer is synthesized or obtained. Second, a differential scanning calorimetry (DSC) experiment is conducted to identify the transition temperatures between phases. Third, the polymer is placed in an electrochemical cell with electrodes that create an electrical field across the cell or along one side of the electrochemical cell. The electrochemical cell may be flat or have a complex shape. The polymer is heated to a temperature within the isotropic phase region or the liquid crystalline region. Preferably, the polymer temperature is then decreased to a temperature that is within the liquid-crystal phase region.

An electrical field E is applied, before heating, during heating, after heating, before cooling, during cooling, or after cooling. The E field strength may be from about 0.1 kV/cm to about 3 kV/cm, such as from about 0.8 kV/cm to about 1.6 kV/cm. The E field may be applied for a period of time from about 30 seconds to about 1 hour, for example. The E field causes at least some of the polarizable molecules to become polarized. The polymer temperature is then ramped down to room temperature (e.g., 25° C.) at a ramp rate from about −0.1° C./min to about −20° C./min. The temperature may be held at any point at the start or during the ramp. Finally, the polymer is removed from the electrochemical cell.

In some embodiments, multiple directions of alignment are formed in different volumes of the electrochemical cell via multiple sets of electrodes.

Alignment of polarizable domains may be aided by inducing motion of the polymers by perturbing the polymer melt or the liquid crystalline polymer using acoustic energy (e.g., sonication) or mechanical energy (e.g., shear deformation).

Other options for alignment may take advantage of the shear-thinning nature of liquid-crystal polymers. The polymer may be heated outside of the electrochemical cell. Then, an electrical field may be applied to the electrochemical cell and the polymer may be injection-molded into the electrochemical cell.

Some embodiments are premised on the use of a magnetic field rather than an electrical field, or the use of both a magnetic field and an electrical field. The magnetic field causes alignment though the magnetic anisotropy of the liquid crystalline structures in the polymer. Polymers with polarizable groups have greater magnetic anisotropy along the chains compared to across the chains. When the polymers organize into liquid crystalline structures, the chain direction is aligned across polymer molecules by the liquid crystalline order; long-range alignment becomes possible.

The magnetic field may be applied before heating, during heating, after heating, before cooling, during cooling, or after cooling. The magnetic field strength may be from about 0.2 T to about 10 T, such as from about 1 T to about 5 T, for example. The magnetic field may be applied for a period of time from about 1 minute to about 24 hours, for example. The magnetic field is configured using permanent magnets or electromagnets. Generally speaking, a magnetic field is weaker than an electrical field. Nevertheless, in some embodiments, a magnetic field is sufficient for the desired alignment of crystals.

Some embodiments provide a method of making an anisotropic thermally conductive polymer composition, the method comprising:

synthesizing or obtaining a polymer containing polarizable domains;

heating the polymer to form a polymer melt, wherein the polymer melt is typically not dissolved in a solvent;

cooling the polymer melt to form a thermotropic liquid-crystal polymer containing the polarizable domains;

exposing the thermotropic liquid-crystal polymer and/or the polymer melt to a magnetic field, thereby aligning at least some of the polarizable domains along a crystal axis; and recovering the thermotropic liquid-crystal polymer as an anisotropic thermally conductive polymer composition.

Alignment of polarizable domains with electrical fields and/or magnetic fields is generally faster when using low-molecular-weight polymers because they are more mobile than high-molecular-weight polymers. However, high-molecular-weight polymers are preferred for reduced phonon scattering and high thermal conductivity. Some embodiments address this trade-off by increasing the molecular weight of the polymer after alignment, such as by (i) making low-molecular-weight polymer molecules (such as $M_w=10^2$-$10^4$ g/mol), (ii) aligning the polymer molecules at elevated temperature in an electrical or magnetic field, and (iii) inducing bonding between the terminal ends of the polymer molecules, to generate a final liquid-crystal polymer composition with higher molecular weight (such as $M_w>10^4$ g/mol).

For example, the terminal ends of a low-molecular-weight liquid-crystal polyester may be synthesized to have hydroxyl functional groups. These may be used for bonding, or a reactive end may be grafted to the hydroxyl group. This reactive end group may be an isocyanate, a blocked isocyanate, an acrylate, an epoxide, an amine, or a vinyl group, for instance.

Additional terminal ends may be reversible bonding groups, such as conjugated dienes and substituted alkenes (such as furans and maleimides), for Diels-Alder reactions. The bonding groups may be reversibly dissociative at elevated temperature. With this approach, a lower-molecule-weight polymer increases in molecular weight when cold. When heated for alignment of polarizable domains, the polymer with reactive end groups is reduced in molecular weight and more alignable. After alignment and cooling below the alignment temperature, the polymer is then transformed back to a high molecular weight.

In some embodiments, bonding is induced with an elevated temperature, and/or by applying a vacuum to trigger condensation of hydroxyls, and/or by applying ultraviolet light to trigger bonding of acrylates or vinyl groups.

One or more additives may be present in the anisotropic thermally conductive polymer composition. Additives, when present, are preferably thermally conductive and also are preferably electrically insulative. Exemplary additives include metal salts, metal oxides (silicon dioxide), graphite, graphene, diamond, sapphire, and combinations thereof.

In some embodiments, the anisotropic thermally conductive polymer composition contains one or more anisotropic fillers. Anisotropic fillers may be incorporated to align with the liquid-crystal polymer, adjust the thermal conductivity in one or more dimensions, tune the thermal expansion in one or more dimensions, and/or reveal where alignment has occurred, for example.

The particle size of additives may be in the nanoparticle size range. In some embodiments, the additive particles have an average particle size ranging from about 10 nm to about 1000 nm, such as from about 100 nm to about 500 nm. Particle sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

EXAMPLES

Example 1: Synthesis of a Thermotropic Main-Chain Liquid-Crystal Polymer

This example describes synthesis of about 20 g of a thermotropic main-chain liquid-crystal homopolymer.

Dimethyl biphenyl-4,4'-dicarboxylate (BB), 1,6-hexanediol (HD), titanium tetraisopropoxide $Ti(OCH(CH_3)_2)_4$, and 1-butanol are purchased from Millipore Sigma and used as received.

For catalyst preparation, 1.04 mL of 1-butanol is removed via syringe from a SureSeal bottle. 1.04 mL $Ti(OCH(CH_3)_2)_4$ is added to the remaining 98.96 mL 1-butanol and is shaken to combine, making a 0.01 g Ti/mL solution.

Two 100-mL round-bottomed flasks, a t-neck with inert gas inlet, a metal stir rod and stirring blade, and a distillation tube are oven-dried at least overnight. 16.696 g BB (1 mol eq), 8.737 g HD (1.2 mol eq), and 0.10 mL Ti catalyst solution (40 ppm) are added to a dry 100-mL round-bottomed flask and affixed with an overhead stirrer, metal stir rod, t-neck adapter, and distillation tube. A $N_2$ purge is started. The distillation tube has a 100-mL collection flask which is in an isopropyl alcohol/liquid $N_2$ bath to catch the distillate. The entire set-up is purged with $N_2$ and degassed (pulling vacuum below 0.0002 bar) four times prior to starting the reaction. The reaction flask is then placed in a 190° C. molten metal bath with $N_2$ purge and stirred at 37 rpm; stirring is increased to 100 rpm over the course of 1 hr. The temperature is then raised to 200° C. while maintaining 100 rpm stirring for 1 hr, followed by a temperature of 220° C. for 2 hr, followed by a temperature of 275° C. for 0.5 hr, and finally 2 hr at 275° C. under vacuum (<0.0002 bar). After the reaction is complete, the round-bottomed flask is removed from the melt bath and allowed to cool with a $N_2$ purge. The polymer is then isolated and used without further purification.

FIG. 2 depicts the structure of the liquid-crystal polymer fabricated in this example (n=6). This polymer is a main-chain polyester with a mesogenic 4,4'-biphenyldicarboxylate repeat unit.

Figure 3:
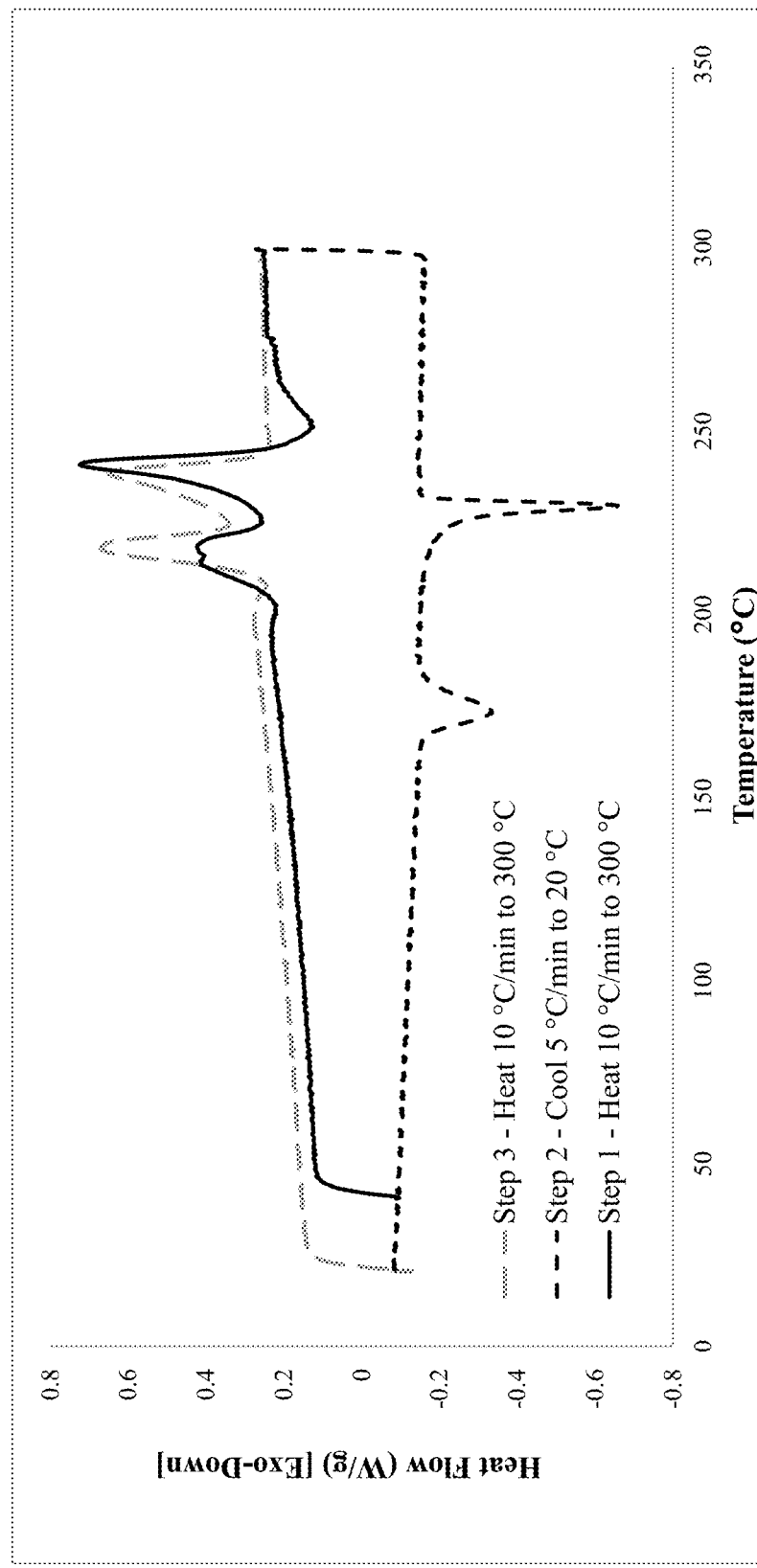
FIG. 3 shows DSC heating and cooling scans in air of the Example 1 liquid-crystal main-chain polyester.

The phase transitions are measured with differential scanning calorimetry (DSC) in air as shown in FIG. 3. The polymer is solid and upon heating to 220° C. it goes from solid to liquid crystalline. As it is heated, the polymer become amorphous at 245° C. The cooling step is at lower temperatures because of hysteretic behavior. In the cooling step, the polymer undergoes an isotropic to liquid crystalline transition at 229° C. and solidifies at 173° C.

Figure 4:
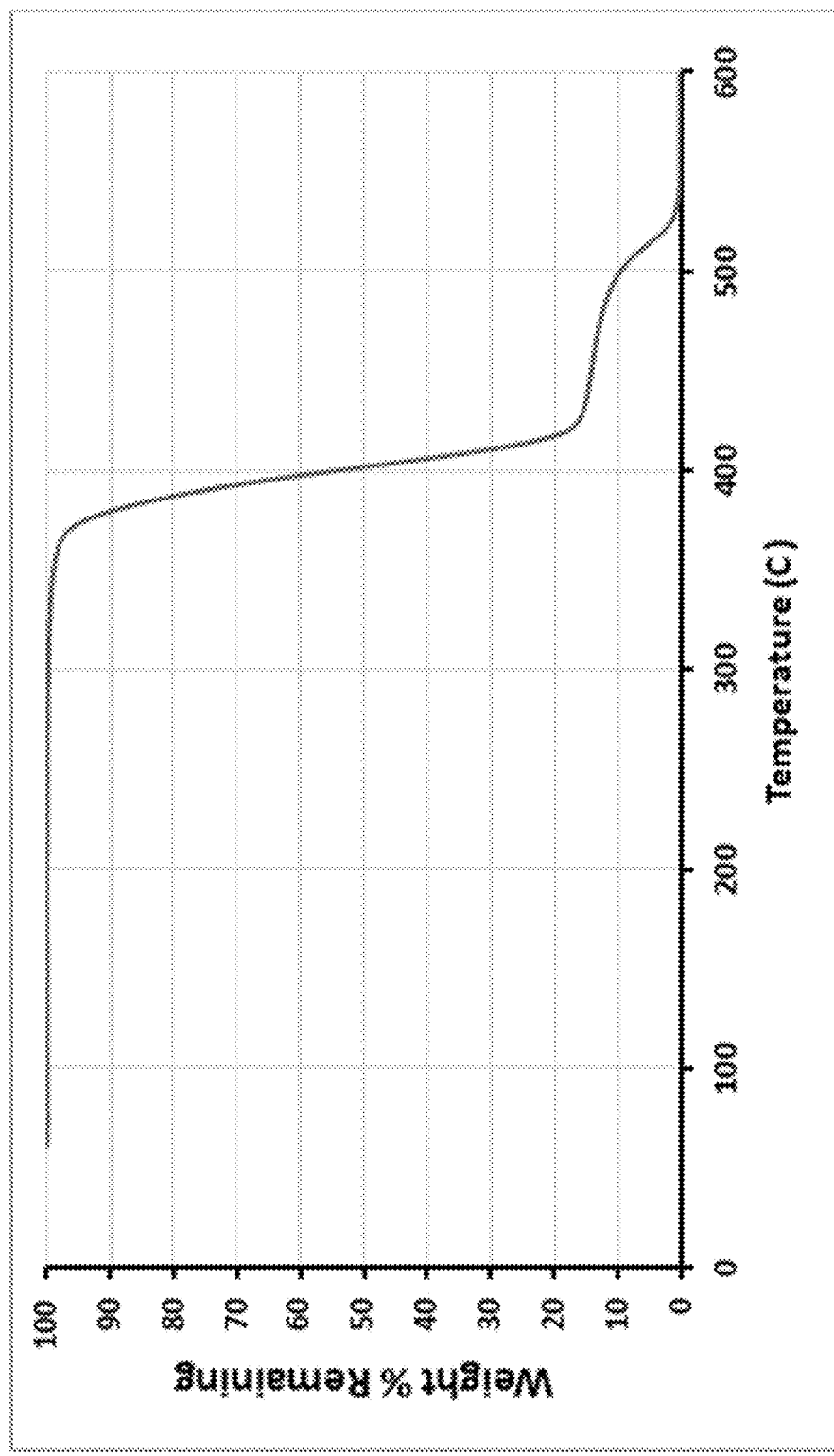
FIG. 4 shows TGA data from a 10° C./min ramp in air, revealing that there is no mass loss until exposure to temperatures >300° C., in Example 1.
Figure 5:
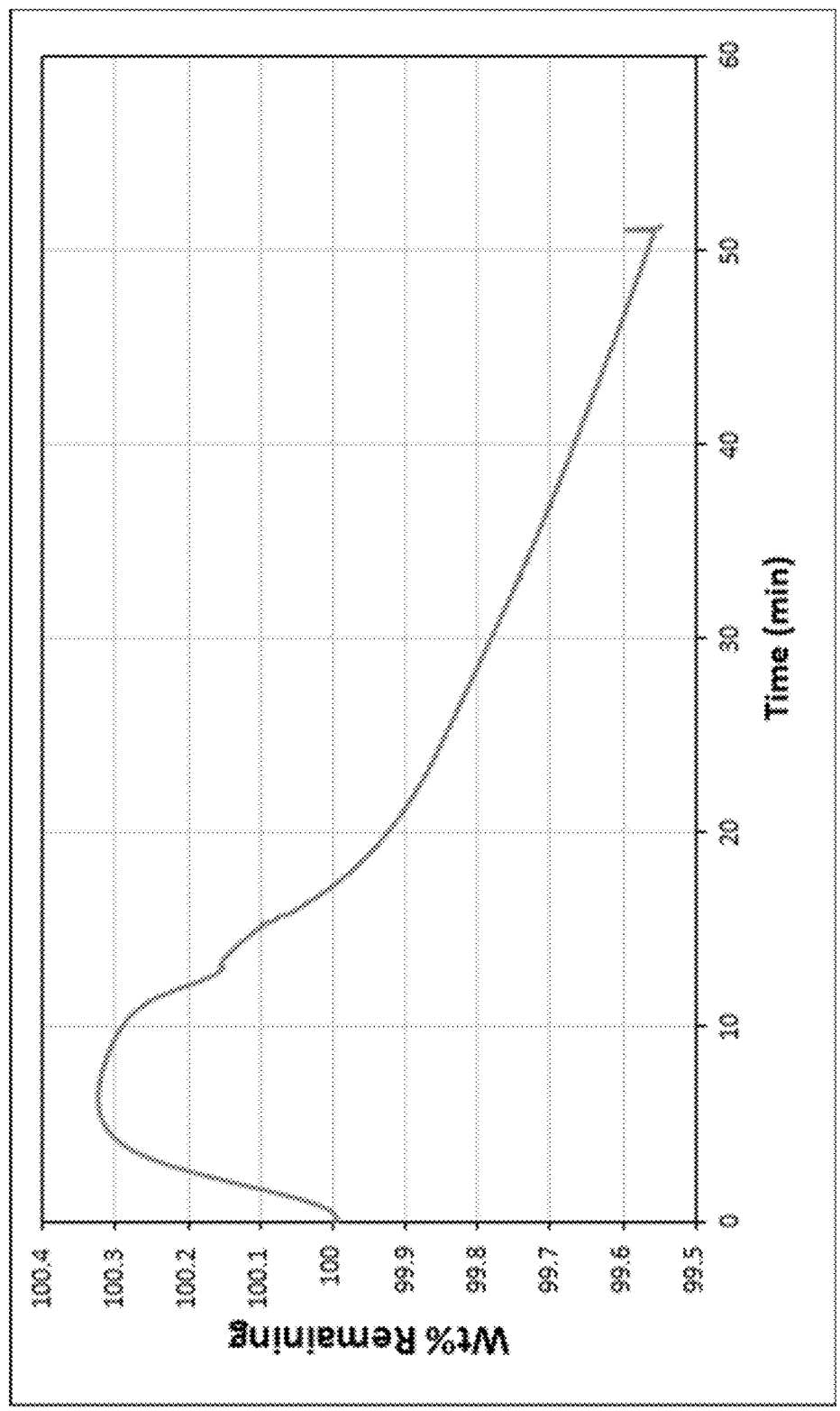
FIG. 5 shows data for 250° C. isothermal TGA in air, revealing that there is less than 0.5% mass loss after 50 minutes, in Example 1.

FIG. 4 shows thermogravimetric analysis (TGA) data from a 10° C./min ramp in air, revealing that there is no mass loss until exposure to temperatures >300° C. FIG. 5 shows data for 250° C. isothermal TGA in air, revealing that there is less than 0.5% mass loss after 50 minutes. These data indicate the polymer may be heated up to 250° C. without a change in chemical composition. The TGA experiments indicate that heating the polymer above the melting temperature to 250° C. does not damage it.

Example 2: Alignment of a Thermotropic Main-Chain Liquid-Crystal Polymer

The thermotropic main-chain liquid-crystal homopolymer of Example 1 is formed into 2-mm-thick pucks in a 0.635-cm internal-diameter gasket in a spring-loaded electrochemical cell. The electrochemical cell has two electrodes on the top and bottom of the 2-mm-thick puck. The gasket acts as a shim to control the gap between the electrodes. Three samples are made:

Sample 1: No-field control. The sample is heated to 250° C. (isotropic phase) and cooled, with no electrical field.

Sample 2: Field on in isotropic phase. The sample is heated to 250° C., held for 10 min, exposed to a 1 kV/cm electrical field, held for 1 hr, cooled at −5° C./min to 25° C., and then the electrical field is turned off.

Sample 3: Field on in liquid crystalline (LC) phase. The sample is heated to 250° C., held for 10 min, cooled at −5° C./min to 210° C., exposed to a 1 kV/cm electrical field, held for 1 hr, cooled at −5° C./min to 25° C., and then the electrical field is turned off.

Figure 6:
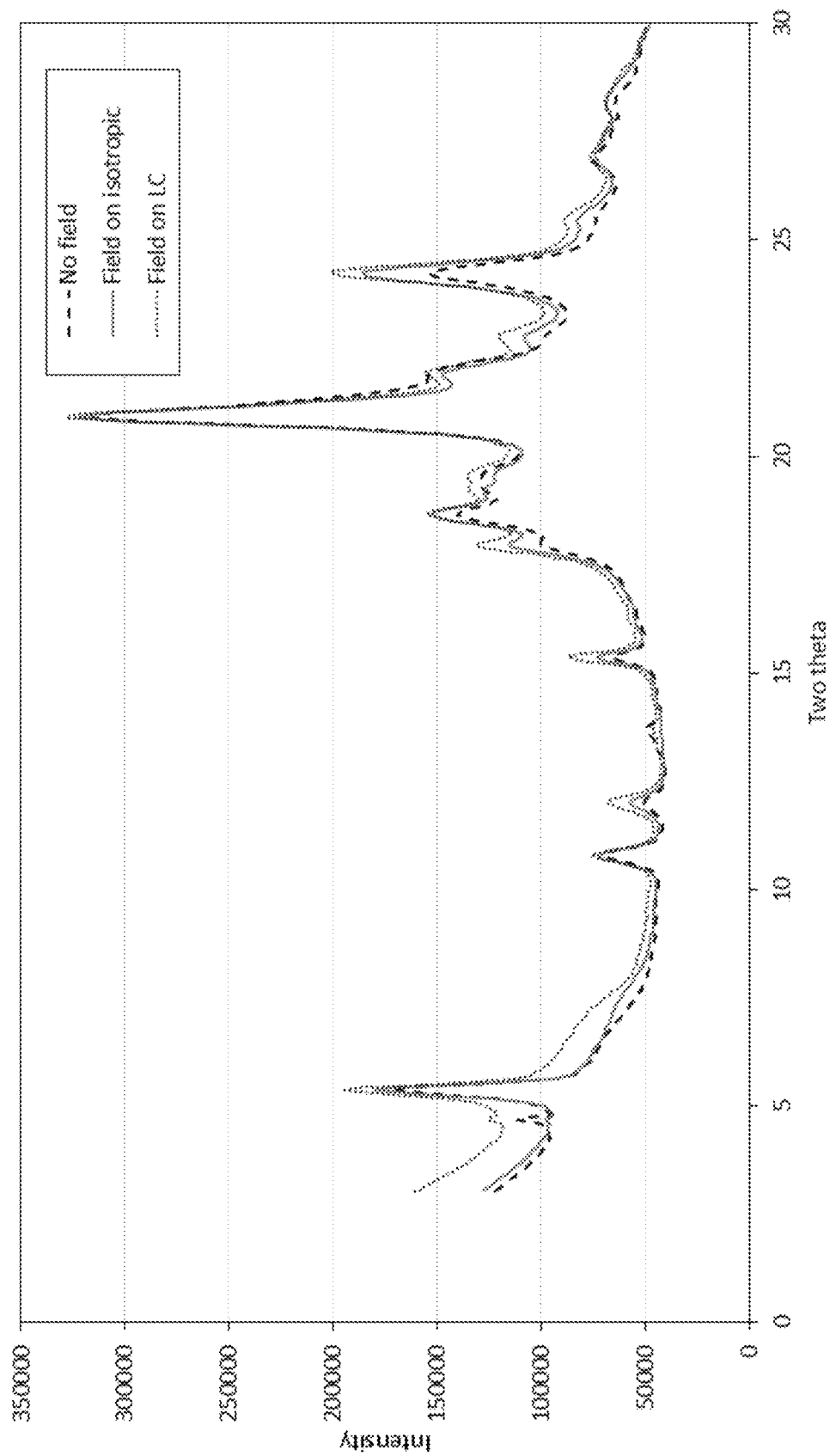
FIG. 6 shows XRD data for a control sample and electrical-field-aligned samples, in Example 2.

The three samples are analyzed with XRD to check for alignment as shown in FIG. 6. The peaks at 2θ=5.5° and 2θ=11° are for the interlayer spacing, while the peaks for higher values of 2θ are from intralayer spacing in the smectic liquid-crystal phase.

Figure 7:
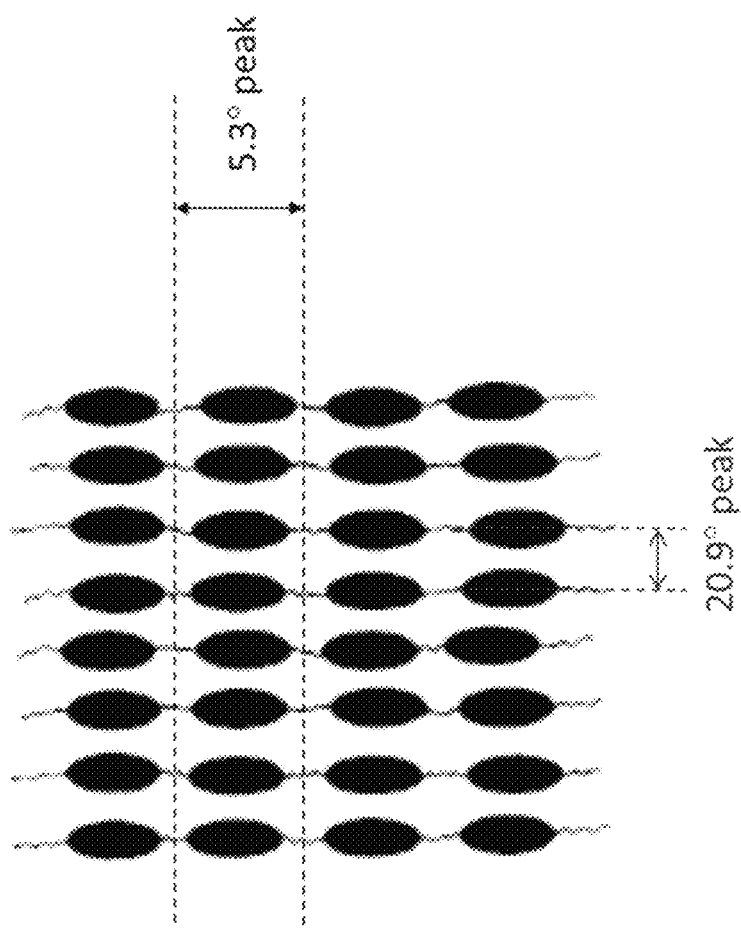
FIG. 7 is a schematic of an aligned smectic liquid-crystal polymer, in Example 2.

FIG. 7 is a schematic of an aligned smectic liquid-crystal polymer. The XRD reflections are shown with dotted lines in FIG. 7 and labeled with the peak position taken from FIG. 6. Sample 3 is oriented relative to the incoming XRD beam from the right side of the drawing of FIG. 7. The XRD beam probes the sample from the right and preferentially scatters off horizontal layers, which is why the 20.9° peak is enhanced relative to the 5.3° peak. Note that if the polymer were perfectly aligned, the 5.3° peak would not be present.

In FIG. 6, since the peak widths are similar, changes in the XRD peak intensity ratios show how alignment changes with conditions. The ratio between intralayer and interlayer peak heights reflects the degree of alignment of the liquid crystal relative to the X-ray beam. In Table 1, it is observed that applying an electrical field increases the amount of the smectic intralayer detected by the X-ray beam and decreases the amount of interlayer periodicity detected.

XRD peak intensity ratios between listed peaks and the (001) peak are shown for samples that were heated above the melting temperature, and cooled without an electrical field or cooled with an electrical field applied in the isotropic phase or in the liquid-crystal phase. The second row shows peak positions in degrees two theta (2θ).

In Table 1, all peaks are ratioed to the (001) interlayer peak for each sample. For all samples, the (001):(002) ratio is near constant, which is expected because they are both created from the same orientation. Conversely, there is an enhancement of the smectic intralayer reflections compared to the interlayer reflections. The enhancement from greatest to least is from: Sample 3 (field on in LC phase)>Sample 2 (field on in isotropic phase)>Sample 1 (no field).

Melt spinning and shear can produce alignment of main-chain thermotropic liquid crystals. This alignment is usually along the shear direction for high-molecular-weight polymers and can be perpendicular to the shear direction for low molecular weights. This change in alignment is due to the size of crystalline domains that either align or rotate in the flow. When shear creates alignment perpendicular to the flow, it is alignment in a plane and not alignment along an axis, because anywhere in the plane is perpendicular to the flow direction.

It was shown in Tokita et al., *Polymer Journal*, Vol. 30, No. 8, pp. 687-690 (1998), which is hereby incorporated by reference, that applying a shear force to the liquid-crystal phase of the polymer of FIG. 2 will create alignment with the shear direction perpendicular to polymer chains, which is why the intralayer peak ratios are greatest for Sample 3 (field on in LC phase) of Table 1. It is also known from Tokita et al. that applying shear in the isotropic phase will create alignment of polymer chains parallel to the shear direction, which is not observed experimentally in this Example 2. Because this example cools with a field on from the isotropic through the LC phase for Sample 2 (field on in isotropic phase), that sample is reoriented to an alignment that is expected for the liquid-crystal phase. The realignment may have been limited by the sample having been previously aligned in an opposite direction.

TABLE 1

XRD Peak Intensity Ratios for Samples 1, 2, and 3.

|  | Inter (001) 5.3° | Inter (002) 10.8° | Intra 12.0° | Intra 15.4° | Intra 18.0° | Intra 18.7° | Intra 20.9° | Intra 22.0° | Intra 22.8° | Intra 24.2 |
|---|---|---|---|---|---|---|---|---|---|---|
| Sample 1 | 1.00 | 0.31 | 0.11 | 0.19 | 0.33 | 0.73 | 2.66 | 0.72 | 0.15 | 0.89 |
| Sample 2 | 1.00 | 0.32 | 0.17 | 0.26 | 0.47 | 0.82 | 2.58 | 0.65 | 0.24 | 1.18 |
| Sample 3 | 1.00 | 0.33 | 0.27 | 0.37 | 0.61 | 0.94 | 3.51 | 0.81 | 0.32 | 1.76 |

Note:
Inter = Interlayer;
Intra = Intralayer.

The intensity of the (001) peak relative to the most-intense intralayer peak decreased by 23% from the control (Sample 1, no field) to Sample 3. A fully aligned sample would typically have 90% or greater reduction in relative intensity. This shows partial alignment has been achieved in this example. A lower-molecular-weight liquid-crystal polymer, optionally with reactive end groups, is expected to result in greater extents of alignment.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An anisotropic thermally conductive polymer composition comprising a plurality of thermotropic main-chain liquid-crystal polymer molecules,
   wherein said thermotropic main-chain liquid-crystal polymer molecules each contain crystalline domains;
   wherein said thermotropic main-chain liquid-crystal polymer molecules are polarizable;
   wherein said thermotropic main-chain liquid-crystal polymer molecules are characterized by a weight-average molecular weight from about $10^2$ g/mol to about $10^7$ g/mol;
   wherein said thermotropic main-chain liquid-crystal polymer molecules are in a nematic phase, a smectic phase, or a combination thereof; and
   wherein at least 80% of said crystalline domains are aligned along a crystal axis with a full width at half maximum degree of alignment of 10 degrees or less.

2. The anisotropic thermally conductive polymer composition of claim 1, wherein said thermotropic main-chain liquid-crystal polymer molecules are not dissolved in a solvent.

3. The anisotropic thermally conductive polymer composition of claim 1, wherein said thermotropic main-chain liquid-crystal polymer molecules are in solid form.

4. The anisotropic thermally conductive polymer composition of claim 1, wherein said crystalline domains contain aromatic rings.

5. The anisotropic thermally conductive polymer composition of claim 1, wherein at least 90% of said crystalline domains are aligned along said crystal axis with said full width at half maximum degree of alignment of 10 degrees or less.

6. The anisotropic thermally conductive polymer composition of claim 1, wherein said anisotropic thermally conductive polymer composition is in the form of an object with a minimum dimension and a maximum dimension, and wherein the aspect ratio of said maximum dimension to said minimum dimension is selected from 1 to about 100.

7. The anisotropic thermally conductive polymer composition of claim 6, wherein said aspect ratio is selected from 1 to about 10.

8. The anisotropic thermally conductive polymer composition of claim 6, wherein said object is characterized by thermal conductivity along said minimum dimension that is at least three times greater than thermal conductivity along said maximum dimension.

9. The anisotropic thermally conductive polymer composition of claim 6, wherein said object is characterized by thermal conductivity along said minimum dimension that is at least ten times greater than thermal conductivity along said maximum dimension.

10. The anisotropic thermally conductive polymer composition of claim 6, wherein said object is characterized by thermal conductivity along said maximum dimension that is at least three times greater than thermal conductivity along said minimum dimension.

11. An anisotropic thermally conductive polymer composition comprising a plurality of thermotropic side-chain liquid-crystal polymer molecules,
    wherein said thermotropic side-chain liquid-crystal polymer molecules each contain crystalline domains;
    wherein said thermotropic side-chain liquid-crystal polymer molecules are polarizable;
    wherein said thermotropic side-chain liquid-crystal polymer molecules are characterized by a weight-average molecular weight from about $10^2$ g/mol to about $10^7$ g/mol;
    wherein said thermotropic side-chain liquid-crystal polymer molecules are in a nematic phase, a smectic phase, or a combination thereof; and
    wherein at least 80% of said crystalline domains are aligned along a crystal axis with a full width at half maximum degree of alignment of 20 degrees or less.

12. The anisotropic thermally conductive polymer composition of claim 11, wherein said thermotropic side-chain liquid-crystal polymer molecules are not dissolved in a solvent.

13. The anisotropic thermally conductive polymer composition of claim 11, wherein said thermotropic side-chain liquid-crystal polymer molecules are in solid form.

14. The anisotropic thermally conductive polymer composition of claim 11, wherein said thermotropic side-chain liquid-crystal polymer molecules each contain amorphous domains.

15. The anisotropic thermally conductive polymer composition of claim 11, wherein said crystalline domains contain aromatic rings.

16. The anisotropic thermally conductive polymer composition of claim 11, wherein at least 90% of said crystalline domains are aligned along said crystal axis with said full width at half maximum degree of alignment of 20 degrees or less.

17. The anisotropic thermally conductive polymer composition of claim 16, wherein said full width at half maximum degree of alignment is 10 degrees or less.

18. The anisotropic thermally conductive polymer composition of claim 11, wherein said anisotropic thermally conductive polymer composition is in the form of an object with a minimum dimension and a maximum dimension, and wherein the aspect ratio of said maximum dimension to said minimum dimension is selected from 1 to about 100.

19. The anisotropic thermally conductive polymer composition of claim 17, wherein said aspect ratio is selected from 1 to about 10.

20. The anisotropic thermally conductive polymer composition of claim 17, wherein said object is characterized by a coefficient of thermal expansion along said crystal axis that is at least 25% lower compared to an otherwise-equivalent side-chain liquid-crystal polymer with no alignment of said crystalline domains.

21. The anisotropic thermally conductive polymer composition of claim 17, wherein said object is characterized by a coefficient of thermal expansion along said crystal axis that is at least 50% lower compared to an otherwise-equivalent side-chain liquid-crystal polymer with no alignment of said crystalline domains.

\* \* \* \* \*